United States Patent
Yoshida et al.

(10) Patent No.: US 10,503,407 B2
(45) Date of Patent: Dec. 10, 2019

(54) MEMORY SYSTEM AND METHOD FOR CONTROLLING NONVOLATILE MEMORY

(71) Applicant: Toshiba Memory Corporation, Minato-ku, Tokyo (JP)

(72) Inventors: Hideki Yoshida, Yokohama Kanagawa (JP); Shinichi Kanno, Tokyo (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 15/914,009

(22) Filed: Mar. 7, 2018

(65) Prior Publication Data

US 2019/0087089 A1   Mar. 21, 2019

(30) Foreign Application Priority Data

Sep. 21, 2017   (JP) .................................. 2017-181447

(51) Int. Cl.
*G06F 3/06* (2006.01)
*G06F 12/1009* (2016.01)

(52) U.S. Cl.
CPC .............. *G06F 3/061* (2013.01); *G06F 3/064* (2013.01); *G06F 3/0616* (2013.01); *G06F 3/0658* (2013.01); *G06F 3/0688* (2013.01); *G06F 12/1009* (2013.01); *G06F 2212/1016* (2013.01); *G06F 2212/2022* (2013.01)

(58) Field of Classification Search
None
See application file for complete search history.

(56) References Cited

U.S. PATENT DOCUMENTS

| 6,804,674 | B2 | 10/2004 | Hsiao et al. |
| 7,512,957 | B2 | 3/2009 | Cohen et al. |
| 7,565,478 | B2 | 7/2009 | Bennett et al. |
| 7,934,049 | B2 | 4/2011 | Holtzman et al. |
| 2007/0143570 | A1 | 6/2007 | Gorobets et al. |
| 2008/0172519 | A1 | 7/2008 | Shmulevich et al. |
| 2010/0306452 | A1 | 12/2010 | Weber et al. |

(Continued)

FOREIGN PATENT DOCUMENTS

| JP | 2006-164280 A | 6/2006 |
| JP | 5589205 B2 | 9/2014 |

(Continued)

OTHER PUBLICATIONS

Yiying Zhang et al., "De-indirection for Flash-based SSDs with Nameless Writes," 10th USENIX Conference on File and Storage Technologies (FAST '12), Feb. 14-17, 2012, pp. 1-16.

(Continued)

*Primary Examiner* — Kevin Verbrugge
(74) *Attorney, Agent, or Firm* — White & Case LLP

(57) ABSTRACT

According to one embodiment, when receiving a write request to designate a first block number and a first logical address from a host, a memory system determines a first location in a first block having the first block number, to which data from the host is to be written, and writes the data from the host to the first location of the first block. The memory system updates a first address translation table managing mapping between logical addresses and in-block physical addresses of the first block, and maps a first in-block physical address indicative of the first location to the first logical address.

12 Claims, 25 Drawing Sheets

In-block LUT for BLK #1

| LBA | In-block PBA (offset) |
|---|---|
| ⋮ | ⋮ |
| x | +4 |
| x+1 | +5 |
| x+2 | +6 |
| x+3 | +7 |
| ⋮ | ⋮ |

(56) References Cited

U.S. PATENT DOCUMENTS

| | | |
|---|---|---|
| 2011/0055458 A1 | 3/2011 | Kuehne |
| 2011/0107018 A1 | 5/2011 | Honda |
| 2011/0119464 A1 | 5/2011 | Karr et al. |
| 2012/0246385 A1 | 9/2012 | Dhandapani et al. |
| 2012/0284587 A1 | 11/2012 | Yu et al. |
| 2013/0191580 A1 | 7/2013 | Lasser |
| 2013/0246721 A1 | 9/2013 | Fukutomi et al. |
| 2013/0325915 A1 | 12/2013 | Ukai |
| 2014/0025864 A1* | 1/2014 | Zhang ............... G06F 12/0246 711/103 |
| 2015/0261452 A1 | 9/2015 | Moon et al. |
| 2015/0370700 A1 | 12/2015 | Sabol et al. |
| 2017/0116131 A1 | 4/2017 | Lin |
| 2017/0139838 A1 | 5/2017 | Tomlin |
| 2017/0255389 A1 | 9/2017 | Tan |
| 2017/0262365 A1 | 9/2017 | Kanno |
| 2018/0173619 A1 | 6/2018 | Sivasankaran et al. |
| 2019/0087089 A1 | 3/2019 | Yoshida et al. |
| 2019/0129838 A1 | 5/2019 | Yoshida et al. |

FOREIGN PATENT DOCUMENTS

| | | |
|---|---|---|
| JP | 2019-57155 A | 4/2019 |
| TW | 2014-03318 A | 1/2014 |
| TW | 201510723 A | 3/2015 |
| TW | 201732821 A | 9/2017 |

OTHER PUBLICATIONS

Jian Huang et al., "FlashBlox: Achieving Both Performance Isolation and Uniform Lifetime for Virtualized SSDs," 15th USENIX Conference on File and Storage Technologies (FAST '17), Feb. 27-Mar. 2, 2017, pp. 375-390.

"Information technology—ATA/ATAPI Command Set—3 (ACS-3," Revision 5, Working Draft Project American National Standard, Oct. 28, 2013, pp. 1-554.

* cited by examiner

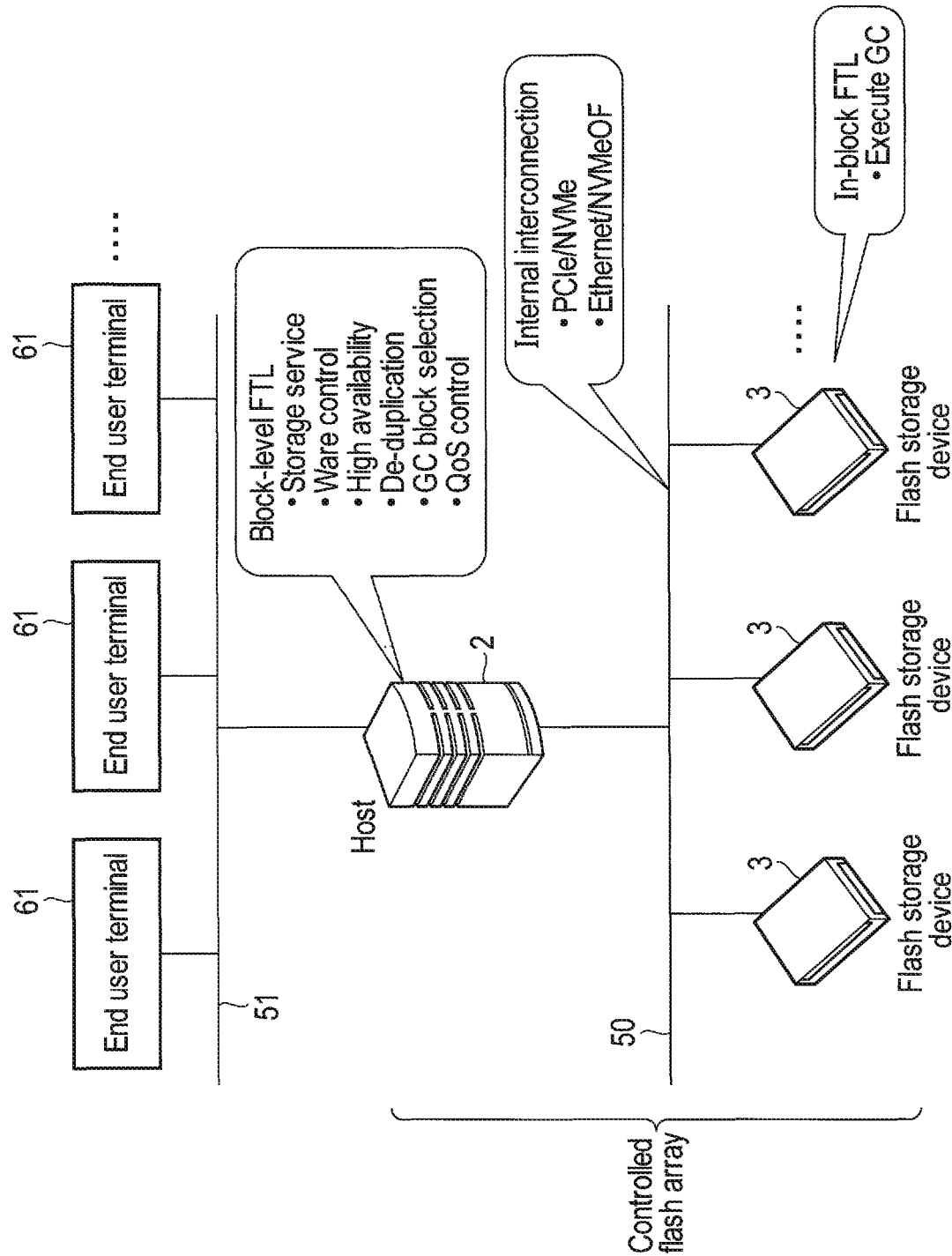
F I G. 1

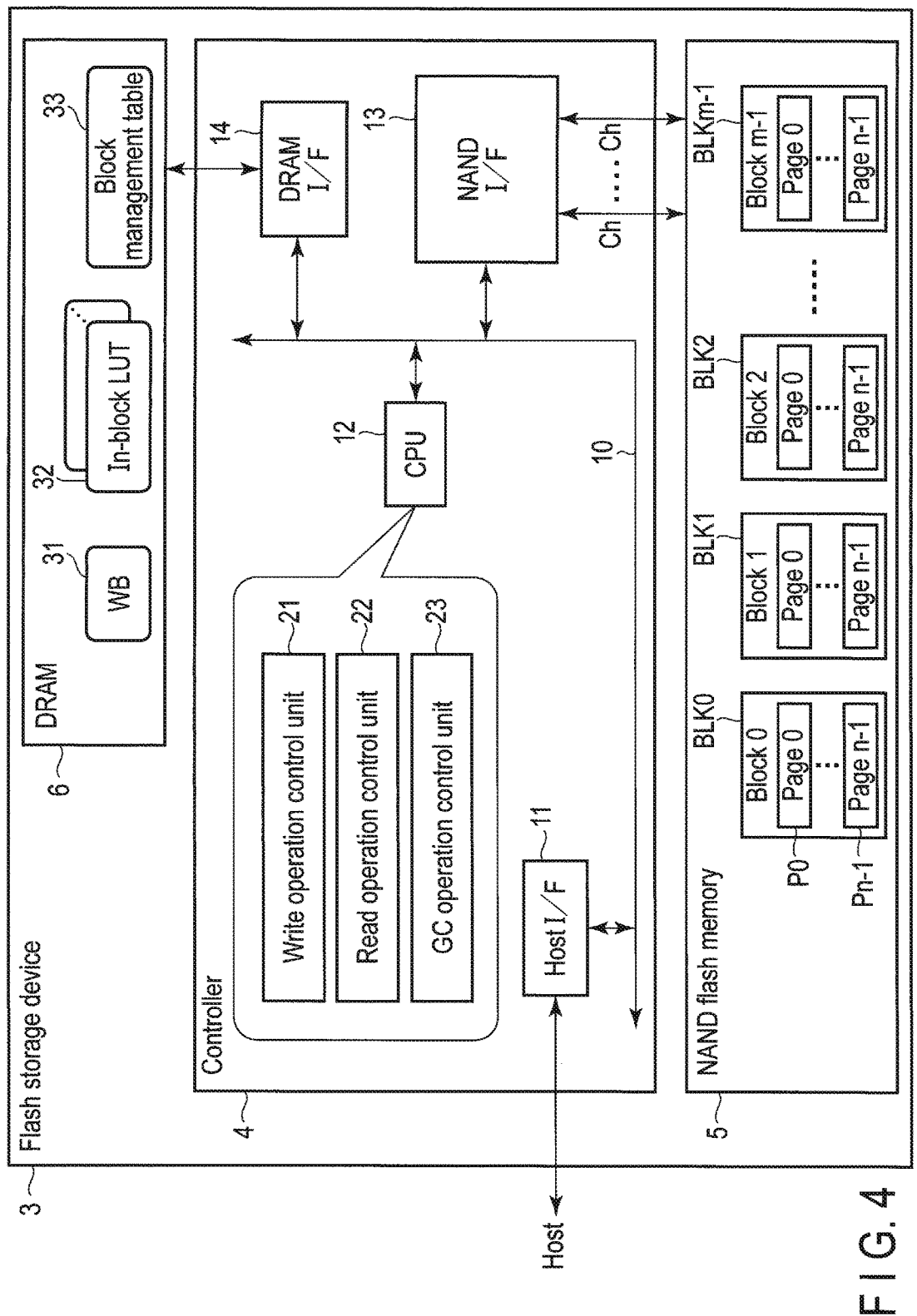
F I G. 4

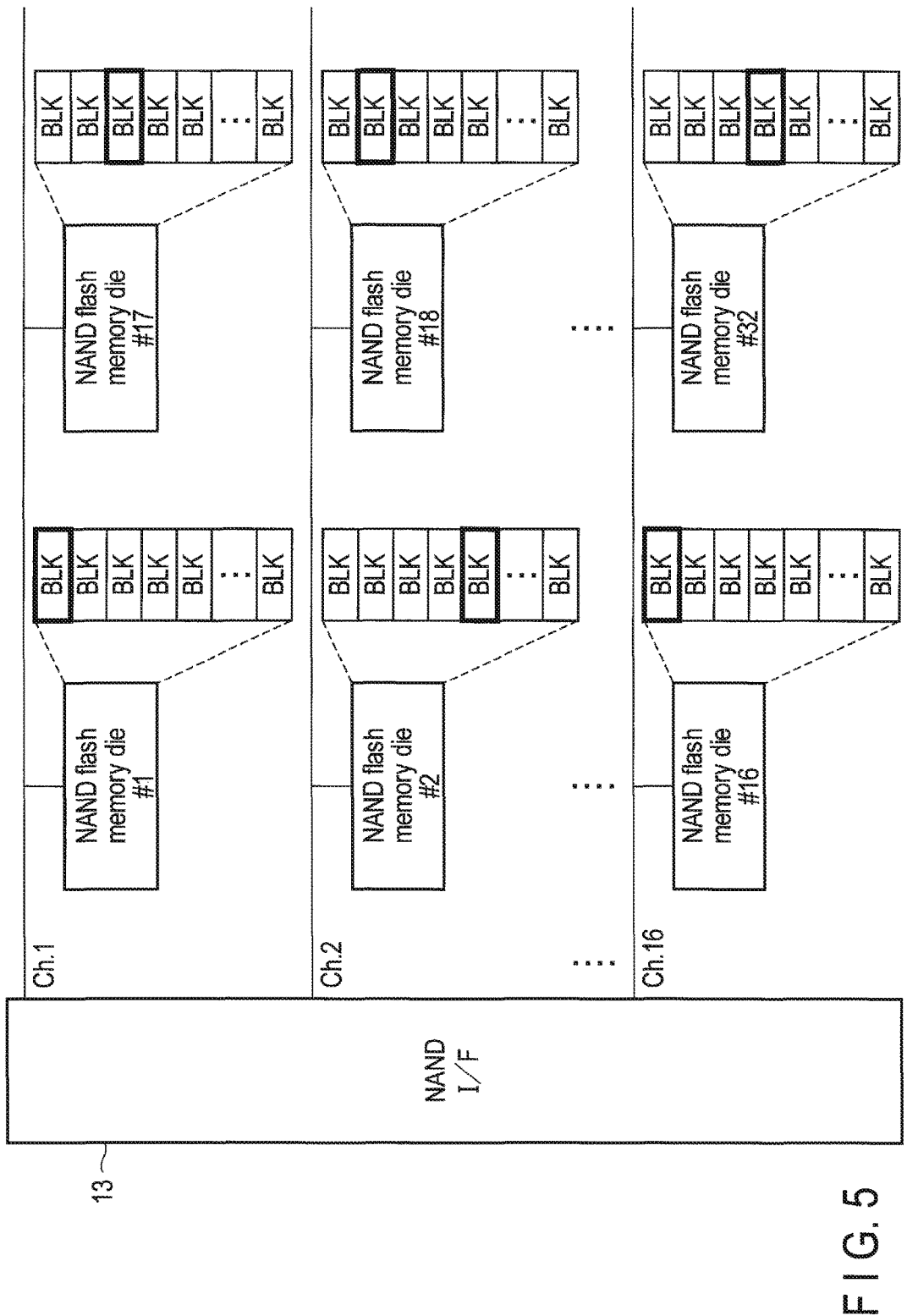
F I G. 5

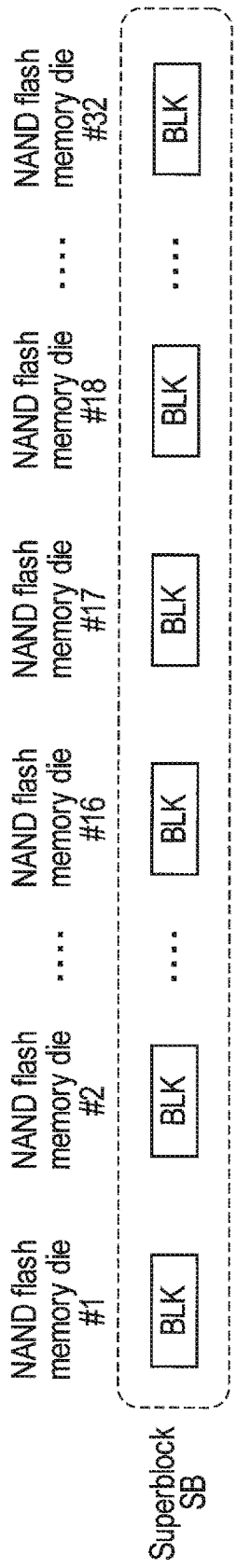
F I G. 6

Write command

|  | Explanation |
|---|---|
| Command ID | Command ID for write command |
| Block number (BLK#) | Physical address designating block to which data is to be written |
| Logical address | Logical address is indicative of first logical location to which data is to be written |
| Length | Length of data to be written |

Trim command

|  | Explanation |
| --- | --- |
| Command ID | Command ID for Trim command |
| Block number (BLK#) | Block number is indicative of block in which data to be invalidated is stored |
| Logical address | Physical address is indicative of first logical location of data to be invalidated |
| Length | Length of data to be invalidated (data length can be designated by number of grains) |

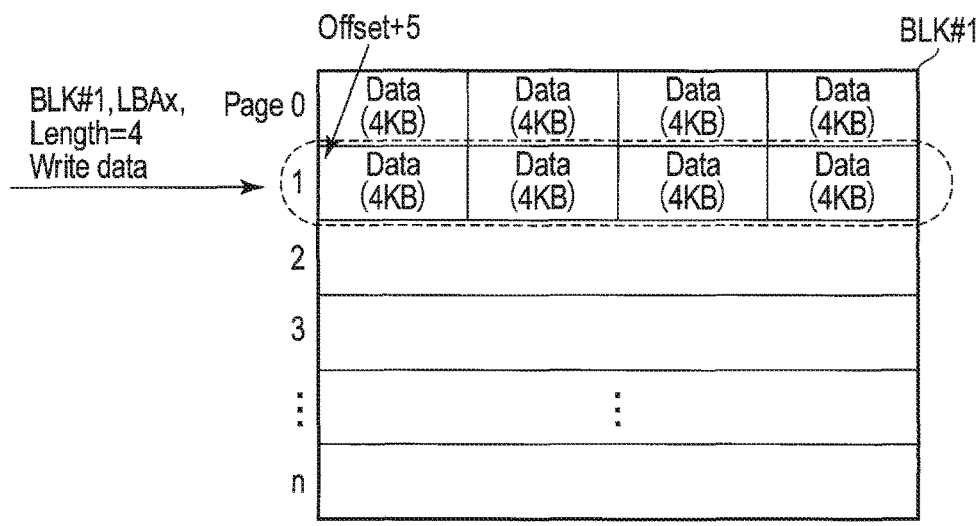
F I G. 11
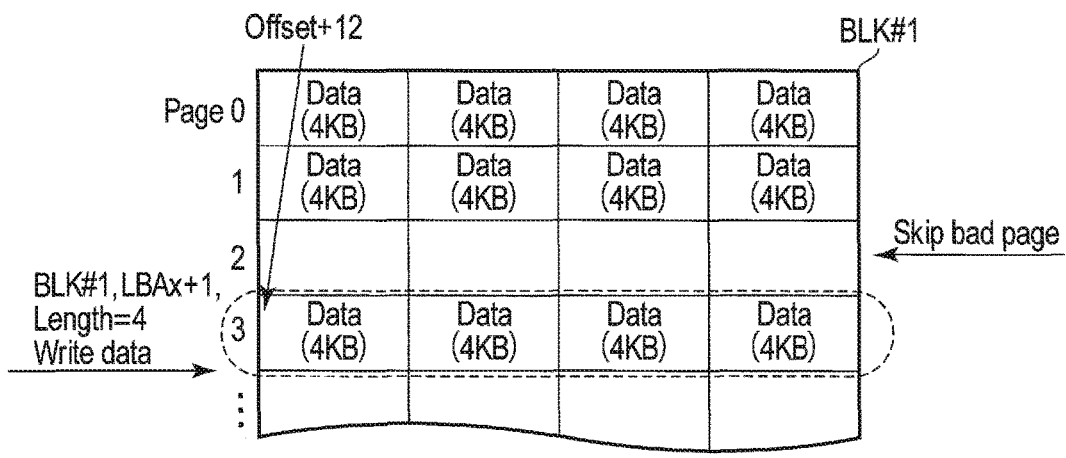
F I G. 12

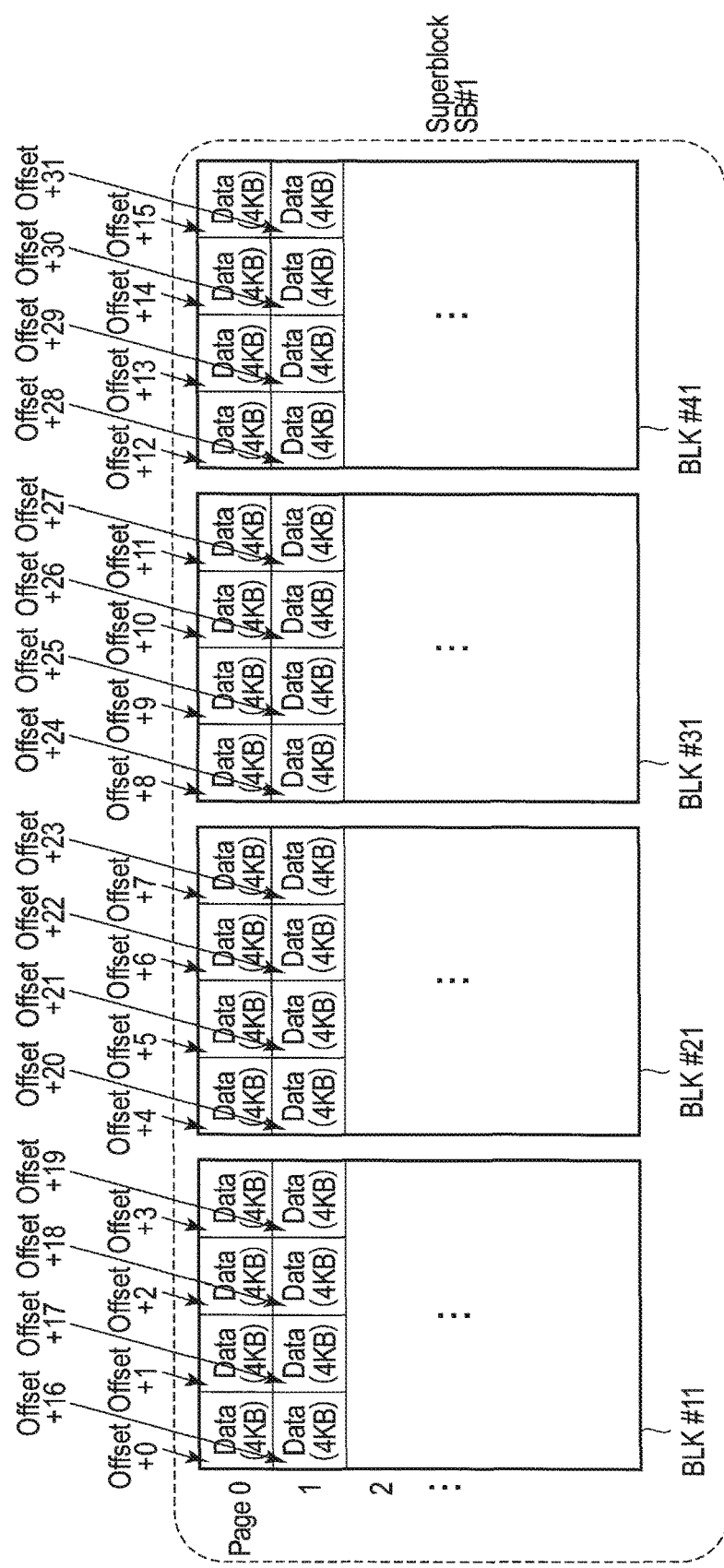
F I G. 16

Maximum block number get command

|  | Explanation |
|---|---|
| Command ID | Command ID for maximum block number get |
| No parameters |  |

FIG. 17

Response to maximum block number get command

|  | Explanation |
|---|---|
| Maximum block number | Maximum block number is indicative of maximum value of in-device block number (i.e., number of available blocks in device) |

FIG. 18

Block size get command

|  | Explanation |
|---|---|
| Command ID | Command ID for block size get |
| (Optional) Block number |  |

FIG. 19

Response to block size get command

|  | Explanation |
|---|---|
| Block size | If block number is designated, device returns size of block corresponding to designated block number to host |

F I G. 20

Block allocate command

|  | Explanations |
|---|---|
| Command ID | Command ID for block allocate |
|  | Host requests device to allocate free block and can thereby acquire block number from device |

F I G. 21

Response to block allocate command

|  | Explanation |
|---|---|
| Block number | Device selects block which should be allocated to host, in free block list, and returns block number of selected block to host |

F I G. 22

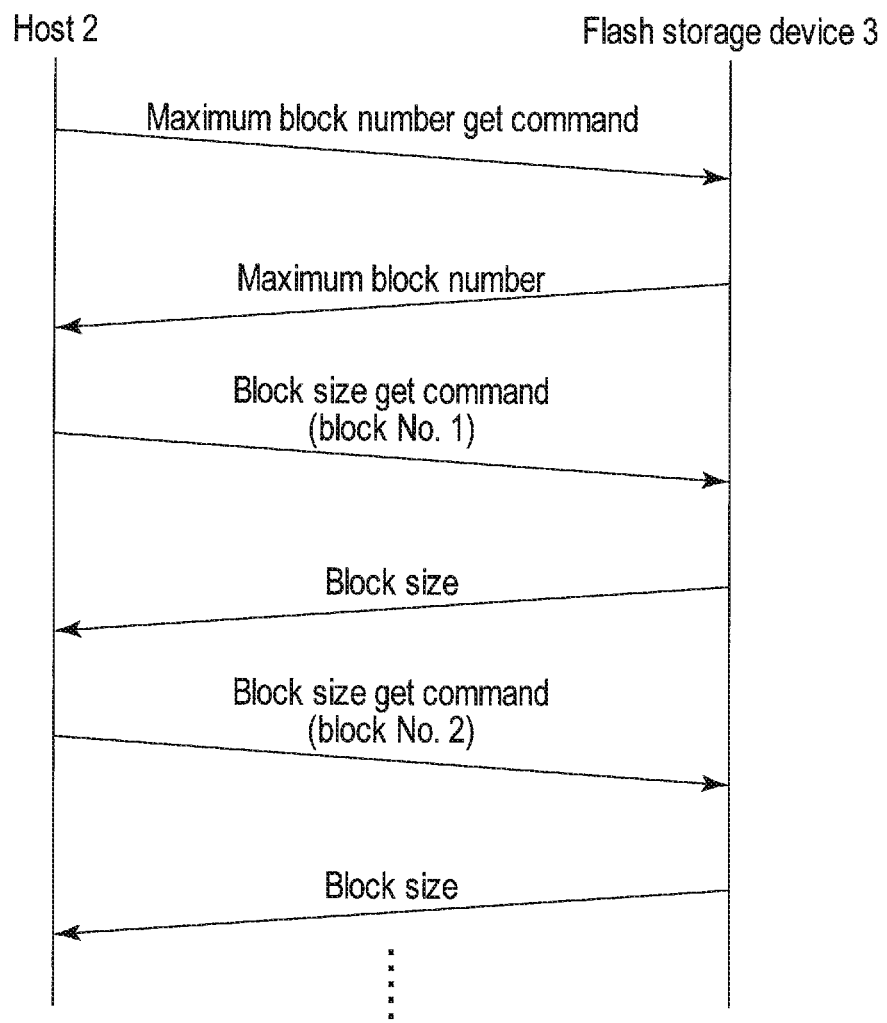
F I G. 23

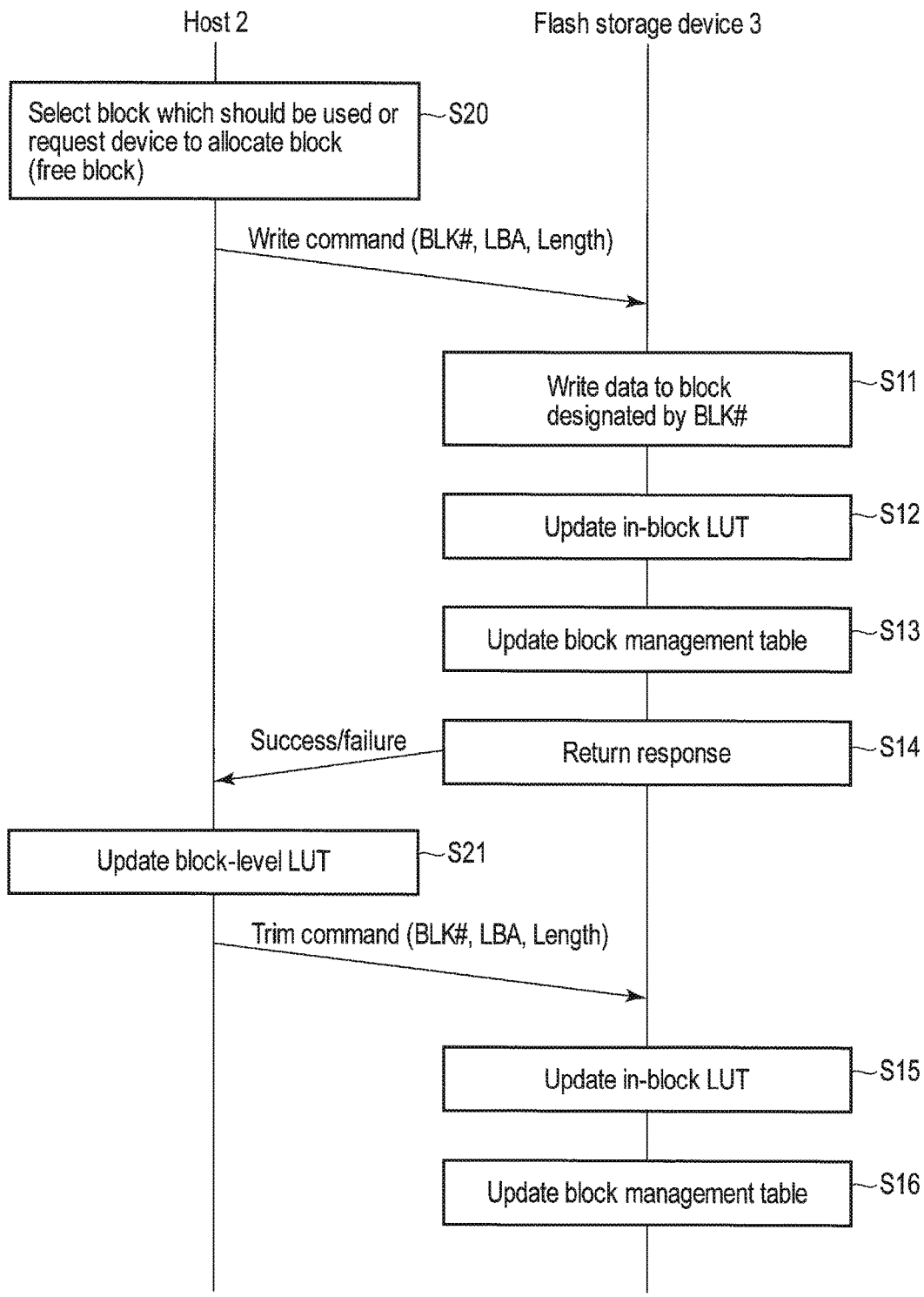
F I G. 24

Block management table for BLK#1

| Offset | Value |
|---|---|
| +0 | 1 |
| +1 | 1 |
| +2 | 1 |
| +3 | 1 |
| +4 | 0→1 |
| +5 | 0→1 |
| +6 | 0→1 |
| +7 | 0→1 |
| +8 | 0 |
| +9 | 0 |
| ⋮ | ⋮ |

0: Invalid
1: Valid

F I G. 27

Block-level LUT (Host)

| | |
|---|---|
| LBA0 | BLK# |
| 1 | BLK# |
| 2 | BLK# |
| ⋮ | ⋮ |
| LBAx | BLK#0→BLK#1 |
| x+1 | BLK#0→BLK#1 |
| x+2 | BLK#0→BLK#1 |
| x+3 | BLK#0→BLK#1 |
| ⋮ | ⋮ |

F I G. 28

Trim command
BLK#0, LBAx, Length=4
BLK#0 In-block LUT
| LBA | Offset |
|---|---|
| ⋮ | ⋮ |
| x→null | +0→null |
| x+1→null | +1→null |
| x+2→null | +2→null |
| x+3→null | +3→null |
| ⋮ | ⋮ |
⟹ Delete
Block management table for block #
| Offset+0 | 1→0 |
|---|---|
| +1 | 1→0 |
| +2 | 1→0 |
| +3 | 1→0 |
| +4 | |
| +5 | |
| ⋮ | ⋮ |
0: Invalid
1: Valid
F I G. 29

Read command
| | Explanations |
|---|---|
| Command ID | Command ID for read command |
| Block number (BLK#) | Block number in which data to be read is stored |
| Logical address | Logical address of data to be read |
| Length | Length of data to be read |
| Transfer destination pointer | Location in host memory to which read data should be transferred |
F I G. 30
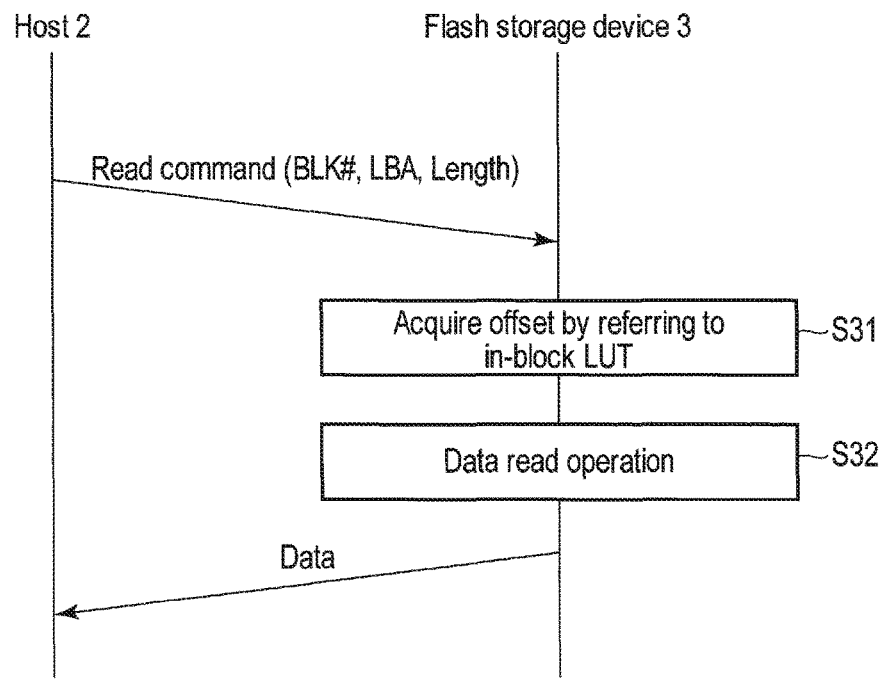
F I G. 31

GC control command

|  | Explanations |
|---|---|
| Command ID | Command ID for GC control |
| GC source block number (BLK#) | Host can designate block which should be GC source block. Host can designate GC source block numbers |
| GC destination block number (BLK#) | Host can designate block which should be GC destination block. Host can designate GC destination block numbers |

FIG. 32

Callback command for GC

|  | Explanations |
|---|---|
| Command ID | Command ID for callback for GC |
| LBA, Destination block number | Pair of LBA of copied data and block number of destination block to which this data is copied |
| LBA, Destination block number | Pair of LBA of copied data and block number of destination block to which this data is copied |
| ⋮ | ⋮ |

FIG. 33

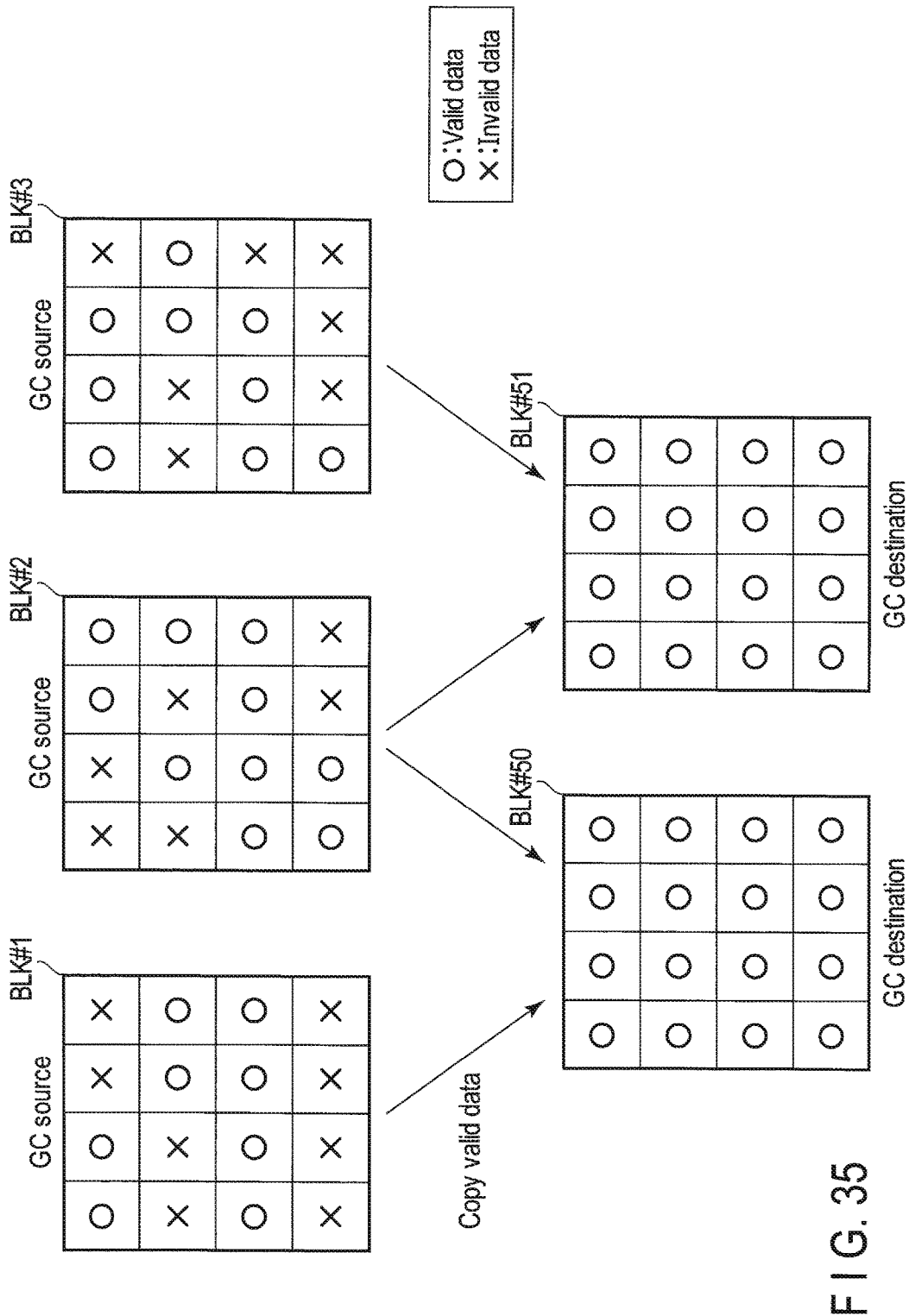
F I G. 35

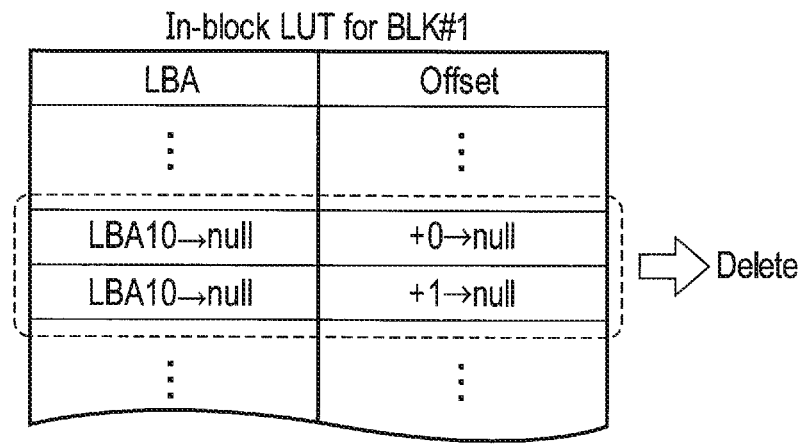
F I G. 38
F I G. 39

MEMORY SYSTEM AND METHOD FOR CONTROLLING NONVOLATILE MEMORY

CROSS-REFERENCE TO RELATED APPLICATIONS

This application is based upon and claims the benefit of priority from Japanese Patent Application No. 2017-181447, filed Sep. 21, 2017, the entire contents of which are incorporated herein by reference.

FIELD

Embodiments described herein relate generally to technology of controlling a nonvolatile memory.

BACKGROUND

In recent years, memory systems comprising nonvolatile memories have been widely prevalent.

As such a memory system, a solid state drive (SSD) based on a NAND flash technology is known.

SSD is also used as the storage in a server of the data center. The storage used in a host computer such as a server is required to exert high-level I/O performance. For this reason, a new interface between a host and a storage has been recently proposed.

In general, however, since control of a NAND flash memory is complicated, appropriate role sharing between a host and a storage (memory system) is required to be considered for implementation of the new interface to improve the I/O performance.

BRIEF DESCRIPTION OF THE DRAWINGS

FIG. 1 is a block diagram showing a relationship between a host and a memory system (flash storage device) according to the embodiments.

FIG. 4 is a block diagram showing a configuration example of the flash storage device according to the embodiments.

FIG. 5 is a block diagram showing a relationship between a NAND interface and a plurality of NAND flash memory dies provided in the flash storage device according to the embodiments.

FIG. 6 is a block diagram showing a configuration example of a super block configured by a plurality of block sets.

FIG. 11 is a table for explanation of a write operation executed in response to a write command.

FIG. 12 is a block diagram for explanation of a write operation which skips a defective page.

FIG. 16 is a block diagram for explanation of a relationship between block numbers and offsets in a case where a super block is used.

FIG. 17 is a table for explanation of a maximum block number get command applied to the flash storage device according to the embodiments.

FIG. 18 is a table for explanation of a response to the maximum block number get command.

FIG. 19 is a table for explanation of a block size get command applied to the flash storage device according to the embodiments.

FIG. 20 is a table for explanation of a response to the block size get command.

FIG. 21 is a table for explanation of a block allocate command applied to the flash storage device according to the embodiments.

FIG. 22 is a table for explanation of a response to the block allocate command.

FIG. 23 is a sequence chart showing block information acquisition executed by the host and the flash storage device according to the embodiments.

FIG. 24 is a sequence chart showing a sequence of write processing executed by the host and the flash storage device according to the embodiments.

FIG. 27 is a diagram for explanation of an operation of updating a block management table managed by the flash storage device according to the embodiments.

FIG. 28 is a diagram for explanation of an operation of updating block-level LUT managed by the flash storage device according to the embodiments.

FIG. 29 is a diagram for explanation of an operation of updating the in-block LUT and the block management table in response to a notification from the host indicative of the block number and the physical address corresponding to data to be invalidated.

FIG. 30 is a table for explanation of a read command applied to the flash storage device according to the embodiments.

FIG. 31 is a diagram for explanation of a read operation executed by the flash storage device according to the embodiments.

FIG. 32 is a table for explanation of a garbage collection (GC) control command applied to the flash storage device according to the embodiments.

FIG. 33 is a table for explanation of a callback command for GC applied to the flash storage device according to the embodiments.

FIG. 35 is a diagram for explanation of an operation of copying all valid data in a plurality of GC source blocks to a plurality of GC destination blocks.

FIG. 38 is an illustration for explanation of contents of an in-block LUT of the GC source block updated based on the result of the data copy operation shown in FIG. 36.

FIG. 39 is an illustration for explanation of contents of a block-level LUT of the host updated based on the result of the data copy operation shown in FIG. 36.

DETAILED DESCRIPTION

Figure 2:
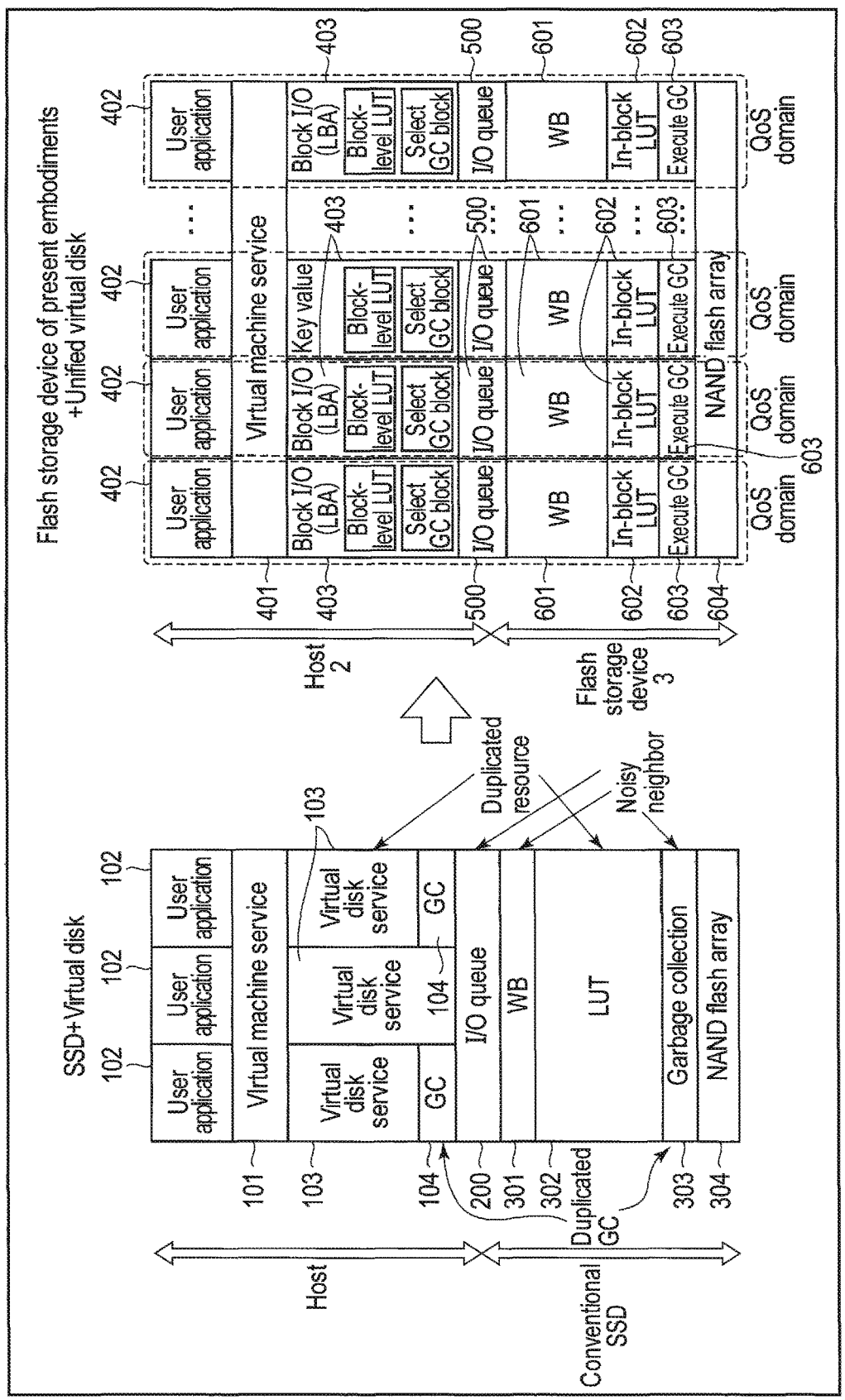
FIG. 2 is a block diagram for explanation of role sharing between conventional SSD and a host, and role sharing between the flash storage device according to the embodiments and the host.

Various embodiments will be described hereinafter with reference to the accompanying drawings.

In general, according to one embodiment, a memory system connectable to a host, comprises a nonvolatile memory including a plurality of blocks each including a plurality of pages, and a controller electrically connected to the nonvolatile memory to control the nonvolatile memory.

When receiving a write request to designate a first block number and a first logical address from the host, the controller determines a first location in a first block having the first block number, to which data from the host is to be written, writes the data from the host to the first location of the first block, updates a first address translation table managing mapping between logical addresses and in-block physical addresses of the first block, and maps a first in-block physical address indicative of the first location to the first logical address.

When receiving a read request to designate the first block number and the first logical address from the host, the controller acquires the first in-block physical address by referring to the first address translation table using the first logical address, and reads data corresponding to the first logical address from the nonvolatile memory, based on the first block number and the acquired first in-block physical address.

First, a configuration of a computing system including a memory system according to one embodiment will be described with reference to FIG. 1.

The memory system is a semiconductor storage device configured to write data to a nonvolatile memory and to read data from the nonvolatile memory. The memory system is implemented as a flash storage device 3 based on the NAND flash technology.

The computing system may include a host (host device) 2 and a plurality of flash storage devices 3. The host 2 may be a server configured to use a flash array composed of a plurality of flash storage devices 3 as a storage. The host (server) 2 and the flash storage devices 3 are interconnected via an interface 50 (internal interconnection). The interface 50 for the internal interconnection is not limited to this, but PCI Express (PCIe) (registered trademark), NVM Express (NVMe) (registered trademark), Ethernet (registered trademark), NVMe over Fabrics (NVMeOF), and the like can be used as the interface.

A typical example of a server which functions as the host 2 is a server in a data center.

In a case where the host 2 is implemented by the server in the data center, the host (server) 2 may be connected to a plurality of end user terminals (clients) 61 via a network 51. The host 2 can provide various services to the end user terminals 61.

Examples of services which can be provided by the host (server) 2 are (1) Platform as a Service (Paas) which provides a system running platform to each client (each end user terminal 61), (2) Infrastructure as a Service (IaaS) which provides an infrastructure such as a virtual server to each client (each end user terminal 61), and the like.

A plurality of virtual machines may be executed on a physical server which functions as the host (server) 2. Each of the virtual machines running on the host (server) 2 can function as a virtual server configured to provide various services to several corresponding clients (end user terminals 61).

The host (server) 2 comprises a storage management function of managing a plurality of flash storage devices 3 constituting a flash array, and a front-end function of providing various services including the storage access to the end user terminals 61.

In the conventional SSD, a block/page hierarchical structure of a NAND flash memory is hidden by a flash translation layer (FTL) in SSD. In other words, FTL of the conventional SSD comprises (1) the function of managing mapping between each of the logic addresses and each of the physical addresses of the NAND flash memory, by using the lookup table which functions as the logical-to-physical address translation table, (2) the function of hiding read/write in page units and the erase operation in block units, (3) the function of executing the garbage collection (GC) of the NAND flash memory, and the like. Mapping between each of the logical addresses and physical addresses of the NAND flash memory cannot be seen from the host. The block/page structure of the NAND flash memory cannot be seen from the host either.

In the host, too, a type of address translation (application-level address translation) is often executed. This address translation manages mapping between each of the application-level logical addresses and each of the logical addresses for SSD, using the application-level address translation table. In addition, in the host, too, a type of GC (application-level GC) for change of data placement in the logical address space is executed for cancellation of a fragment which occurs in the logical address space for SSD.

In a redundant configuration in which each of the host and SSD includes the address translation table (SSD includes the lookup table which functions as the logical-to-physical address translation table while the host includes the application-level address translation table), however, enormous volumes of memory resources are consumed to hold these address translation tables. Furthermore, double address translation including the address translation on the host side and the address translation on the SSD side is also a factor which degrades the I/O performance.

Furthermore, the application-level GC on the host side becomes a factor which increases the amount of data written to SSD to a multiple (for example, double) of the actual user data amount. Such increase of the data write amount degrades the storage performance of the whole system and shortens the life of SSD in cooperation with write amplification of SSD.

A measure of moving all the functions of FTL of the conventional SSD to the host in order to solve this problem has also been considered.

To take this measure, however, the host needs to directly handle blocks and pages of the NAND flash memory. In the NAND flash memory, the host can hardly execute handling due to restrictions on page write order. In addition, the block may often include a defective page (bad page) in the NAND flash memory. Handling the bad page is further difficult for the host.

Thus, in the present embodiments, the role of FTL is shared by the host 2 and the flash storage device 3. In short, the host 2 executes block-level. FTL to allocate blocks and the flash storage device 3 executes in-block FTL to allocate pages in the block.

The host 2 manages a block-level lookup table (block-level LUT) which a the block-level address translation table for managing mapping between each of the logical addresses and each of the block numbers, and the flash storage device 3 manages an in-block lookup table (in-block LUT) which is a page-level address translation table for managing mapping between each of the logical addresses and the in-block physical address of each block.

When the host 2 needs to write data to the flash storage device 3, the host 2 selects the block number (or requests the flash storage device 3 to allocate the free block), and transmits to the flash storage device 3 a write request (write command) designating a logical address and the block number of the selected block (or the block number of the allocated block of which the flash storage device 3 notifies the host 2). The flash storage device 3 writes the data from the host 2 to the block corresponding to the block number designated in the write request (write command). In this case, the flash storage device 3 determines the write destination location of the block and writes the data from the host 2 to the write destination location of the block.

The block-level FTL of the host 2 comprises a function of executing a storage service, a wear control function, a function of implementing high availability, a de-duplication function of preventing a plurality of duplicated data parts having the same contents from block selection function, a QoS control function, and the like. The QoS control function includes a function of determining the access unit for each QoS domain (or each block). The access unit is indicative of the minimum data size (grain) which the host 2 can write/read. The flash storage device 3 supports a single or a plurality of access units (grains) and, if the flash storage device 3 supports the plural access units, the host 2 can instructs the access unit to be used for each QoS domain (or each block) to the flash storage device 3.

In addition, the QoS control function includes a function of preventing performance interference between the QoS domains. This function is basically a function of maintaining stable latency.

In contrast, the in-block FTL of each of the flash storage devices 3 comprises a GC execution function in addition to the function of allocating the pages in the block. The GC execution function copies the valid data in the copy source block (GC source block) selected by the host 2 to the copy destination block (GC destination block) selected by the host 2. The in-block Fit of the flash storage device 3 determines a location (copy destination location) in the GC destination block to which the valid data should be written, and copies the valid data in the GC source block to the copy destination location in the GC destination block.

FIG. 2 shows role sharing between the host and the conventional SSD, and role sharing between the host 2 and the flash storage device 3 according to the present embodiments.

The left part of FIG. 2 shows a hierarchical structure of the whole computing system including the conventional SSD and the host executing virtual disk services.

In the host (server), a virtual machine service 101 for providing a plurality of virtual machines to a plurality of end users is executed. In each of the virtual machines on the virtual machine service 101, an operating system and user applications 102 used by the corresponding end users are executed.

In addition, in the host (server), a plurality of virtual disk services 103 corresponding to the user applications 102 are executed. Each of the virtual disk services 103 allocates a part of the capacity of the storage resource in the conventional SSD as the storage resource (virtual disk) for the corresponding user application 102. In each of the virtual disk services 103, application-level address translation which translates the application-level logical address into the logical address for SSD is also executed by using the application-level address translation table. Furthermore, in the host, application-level GC 104 is also executed.

Transmission of the command from the host (server) to the conventional SSD and return of a response of command completion from the conventional SSD to the host (server) are executed via an I/O queue 200 which exists in each of the host (server) and the conventional SSD.

The conventional SSD comprises a write buffer (WB) 301, a lookup table (LUT) 302, a garbage collection function 303, and a NAND flash memory (NAND flash array) 304. The conventional SSD manages only one lookup table (LUT) 302, and resources of the NAND flash memory (NAND flash array) 304 are shared by the virtual disk services 103.

In this configuration, write amplification becomes large by duplicated GC including the application-level GC 104 under the virtual disk services 103 and the garbage collection function 303 (LUT-level GC) in the conventional SSD. In addition, in the conventional SSD, the noisy neighbor issue that the frequency of GC increases by the increase in data write amount from a certain end user or a certain virtual disk service 103 and the I/O performance for the other end user or the other disk service 103 may be thereby degraded, may occur.

In addition, a number of memory resources are consumed due to the existence of duplicated resource including the application-level address translation table in each virtual disk service and the LUT 302 in the conventional SSD.

The right part of FIG. 2 shows a hierarchical structure of the whole computing system including the host 2 and the flash storage device 3 according to the present embodiments.

In the host (server) 2, a virtual machine service 401 for providing a plurality of virtual machines to a plurality of end users is executed. In each of the virtual machines on the virtual machine service 401, an operating system and user applications 402 used by the corresponding end users are executed.

In addition, in the host (server) 2, a plurality of I/O services 403 corresponding to the user applications 402 are executed. The I/O services 403 may include LBA-based block I/O service, key-value store service, and the like. Each of the I/O services 403 includes a lookup table (LUT) which manages mapping between each of the logical addresses and each of the block numbers of the flash storage device 3. The logical address is indicative of an identifier which can identify data to be accessed. The logical address may be the logical block address (LBA) which designates a location in the logical address space, a key (tag) of the key-value store, or a hash value of the key of the key-value store.

In the LBA-based block I/O service, block-level LUT which manages mapping between each of the logical addresses (LBAs) and each of the block numbers of the flash storage device 3 may be used.

In the key-value store service, block-level LUT which manages mapping between each of the logical addresses (i.e., tags such as keys) and each of the block numbers of the flash storage device 3 in which the data corresponding to the logical addresses (i.e., tags such as keys) are stored may be used. In the block-level LUT, correspondence among the tag, the block number at which data identified by the tag is stored, and a data length of the data may be managed.

Each of the end users can select an addressing method (LBA, a key of the key-value store, or the like) to be employed.

Each block-level LUT does not translate each of the logical addresses from the user application 402 into each of the logical addresses for the flash storage device 3, but translates each of the logical addresses from the user application 402 into each of the block numbers of the flash storage device 3. In other words, each block-level LUT is a table in which the table for translation of the logical address for the flash storage device 3 into the block number and the application-level address translation table are integrated (merged).

In addition, each I/O service 403 includes a GC block selection function. The GC block selection function can manage a valid data amount of each block by using the corresponding to the block-level LUT and can thereby select the GC source block.

In the host (server) 2, the I/O service 403 may exist for each of the QoS domains. The I/O service 403 belonging to a certain QoS domain manages mapping between each of the logical addresses used by the user application 402 in the corresponding QoS domain and each of the block numbers belonging to the resource group allocated to the corresponding QoS domain.

Transmission of the command from the host (server) 2 to the flash storage device 3 and return of a response of command completion or the like from the flash storage device 3 to the host (server) 2 are executed via an I/O queue 500 which exists in each of the host (server) 2 and the flash storage devices 3. The I/O queues 500 may also be classified into a plurality of queue groups corresponding to the QoS domains.

The flash storage device 3 comprises a plurality of write buffers (WB) 601 corresponding to the QoS domains, a plurality of in-block LUTs 602 corresponding to the QoS domains, a plurality of garbage collection (GC) functions 603 corresponding to the QoS domains, and the NAND flash memories (NAND flash array) 604.

In the configuration shown at the right part of FIG. 2, since the upper layer (host 2) can recognize the block boundary, the upper layer can write the user data to each block in consideration of the block boundary/block size. In other words, the host 2 can recognize each of blocks of the NAND flash memory (NAND flash array) 604 and can thereby execute, for example, the control such as simultaneously writing data to one block to fill the entire one block with the data, or invalidating the whole data included in one block by erasing or updating the whole data included in the one block. As a result, a situation in which the valid data and the invalid data exist together in one block can be prevented from easily occurring. The frequency at which GC needs to be executed can be therefore reduced. By reducing the frequency of GC, the write amplification can be lowered, the performance of the flash storage device 3 can be improved, and the life of the flash storage device 3 can be extended to the maximum value. Thus, the configuration that the upper layer (host 2) can recognize the block number is useful.

In contrast, the page which can be currently written is only one page per block. For this reason, showing the page number to the upper layer is not useful as compared with showing the block number to the upper layer.

Figure 3:
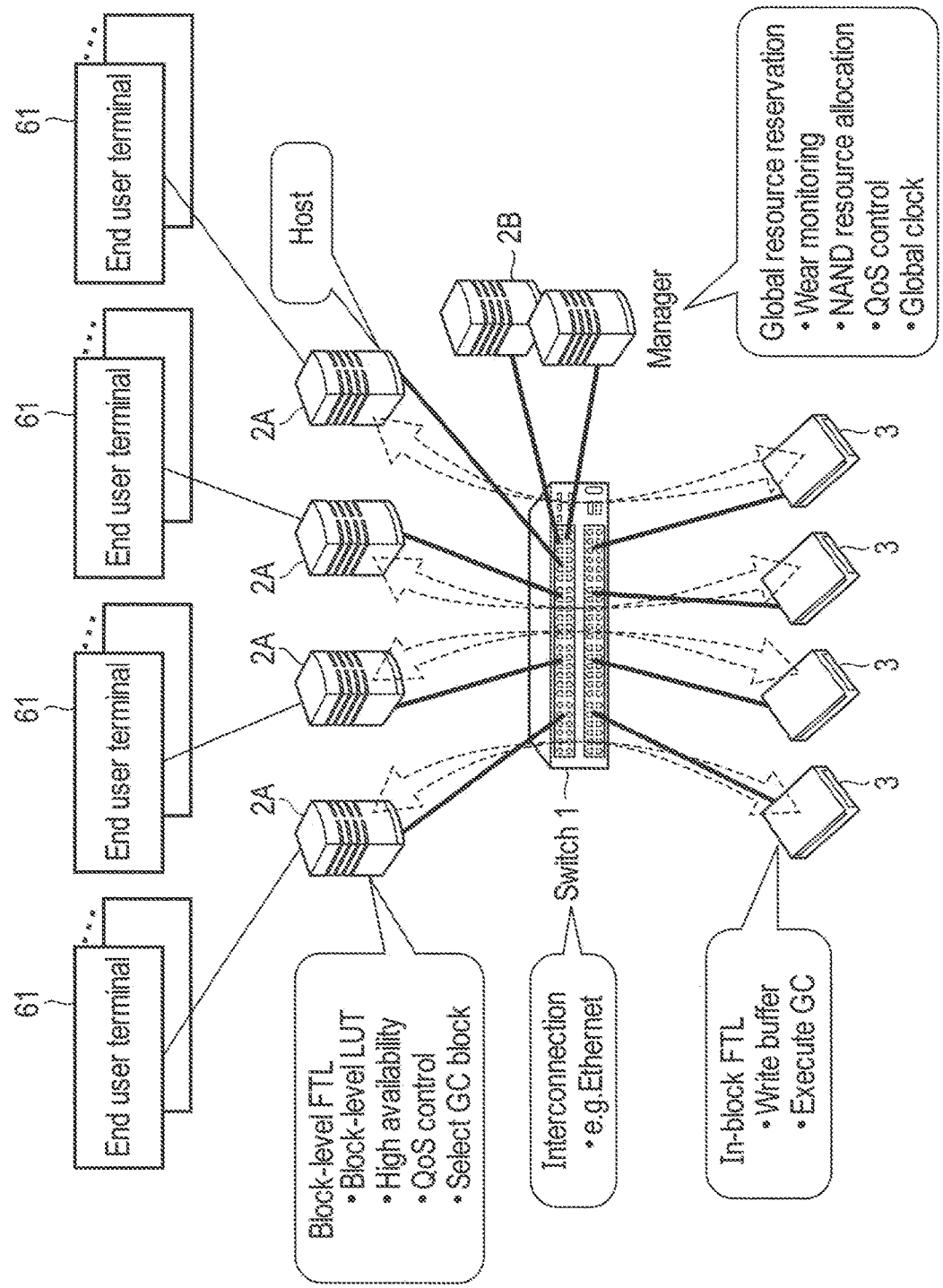
FIG. 3 is a block diagram showing a configuration example of a computing system in which data transfer between a plurality of hosts and a plurality of flash storage devices is executed via a network device.

FIG. 3 shows a modified example of the system configuration shown in FIG. 1.

In FIG. 3, data transfer between a plurality of hosts 2A and a plurality of flash storage devices 3 is executed via a network device (network switch 1).

In a computing system shown in FIG. 3, the storage management function of the server 2 shown in FIG. 1 is moved to a manager 2B, and the front-end function of the server 2 is moved to the hosts (hosts for end user services) 2A.

The manager 2B manages a plurality of flash storage devices 3, and allocates storage resources of the flash storage devices 3 to each of the hosts (hosts for end user services) 2A in response to a request from each of the hosts (hosts for end user services) 2A.

Each of the hosts (hosts for end user services) 2A is connected to at least one end user terminal 61 via a network. Each of the hosts (hosts for end user services) 2A manages the block-level LUT. Each of the hosts (hosts for end user services) 2A manages the only mapping between each of the logical addresses used by the corresponding end user and each of the block numbers of the resource allocated to the own self by using the own block-level LUT. Therefore, this configuration can easily scale out the system.

The block-level FTL of each of the hosts 2 comprises a function of managing the block-level LUT, a function of implementing high availability, a QoS control function, GC block selection function and the like.

The manager 2B is a device (computer) exclusive for managing the flash storage devices 3. The manager 2B comprises a global resource reservation function of reserving the storage resource of the amount required by each of the hosts 2A. Furthermore, the manager 2B comprises a ware monitoring function of monitoring the degree of wear of each of the flash storage devices 3, a NAND resource allocation function of allocating the reserved storage resource (NAND resource) to each of the hosts 2A, a QoS control function, a global clock management function, and the like.

The in-block FTL of each of the flash storage devices 3 comprises a function of managing the write buffer, a GC execution function, and the like.

According to the system configuration shown in FIG. 3, since the management of each of the flash storage devices 3 is executed by the manager 25, each of the hosts 2A needs only to execute an operation of transmitting the I/O request to at least one flash storage device 3 allocated to the own host and an operation of receiving a response from the flash storage device 3. In other words, the data transfer between the hosts 2A and the flash storage devices 3 is executed via the only switch 1 and a manager 25 is not related with the data transfer. In addition, the contents of block-level LUT managed by each of the hosts 2A are independent of each other as explained above. Therefore, since the number of hosts 2A can easily be increased, the scale-out system configuration can be implemented.

FIG. 4 shows a configuration example of the flash storage device 3.

The flash storage device 3 comprises a controller 4 and a nonvolatile memory (NAND flash memory) 5. The flash storage device 3 may comprise a random access memory, for example, a DRAM 6.

The NAND flash memory 5 comprises a memory cell array comprising a plurality of memory cells arrayed in a matrix. The NAND flash memory 5 may be a NAND flash memory of a two-dimensional structure or a NAND flash memory of a three-dimensional structure.

The memory cell array of the NAND flash memory 5 includes a plurality of blocks BLK0 to BLKm−1. Each of the blocks BLK0 to BLKm−1 is formed of a number of pages (pages P0 to Pn−1 in this case). The blocks BLK0 to BLKm−1 function as erase units. The blocks may be referred to as "erase blocks", "physical blocks" or "physical erase blocks". Each of the pages P0 to Pn−1 comprises a plurality of memory cells connected to the same word line. The pages P0 to Pn−1 are units for a data write operation and a data read operation.

The controller 4 is electrically connected to the NAND flash memory 5 which is a nonvolatile memory, via a NAND interface 13 such as toggle or open NAND flash interface (ONFI). The controller 4 is a memory controller (control circuit) configured to control the NAND flash memory 5.

As illustrated in FIG. 5, the NAND flash memory 5 comprises a plurality of NAND flash memory dies. Each of the NAND flash memory dies is a nonvolatile memory plurality of blocks BLK and a peripheral circuit which controls the memory cell array. The individual NAND flash memory dies can operate independently. For this reason, the NAND flash memory dies function as parallel operation units. The NAND flash memory dies are referred to as "NAND flash memory chips" or "nonvolatile memory chips". FIG. 5 illustrates a case where sixteen channels Ch1, Ch2, . . . Ch16 are connected to the NAND interface 13 and the same number (for example, two dies per channel) of NAND flash memory dies are connected to each of the channels Ch1, Ch2, . . . Ch16. Each of the channels comprises communication line (memory bus) for communication with the corresponding NAND flash memory dies.

The controller 4 controls NAND flash memory dies #1 to #32 via the channels Ch1, Ch2, . . . Ch16. The controller 4 can simultaneously drive the channels Ch1, Ch2, . . . Ch16.

Sixteen NAND flash memory dies #1 to #16 connected to the channels Ch1 to Ch16 may be formed as a first bank, and remaining sixteen NAND flash memory dies #17 to #32 connected to the channels Ch1 to Ch16 may be formed as a second bank. The banks function as units of causing a plurality of memory modules to be operated in parallel by bank interleaving. In the configuration example shown in FIG. 5, a maximum of thirty-two NAND flash memory dies can be operated in parallel by sixteen channels and the bank interleaving using two banks.

In the present embodiments, the controller 4 may manage a plurality of blocks (hereinafter called superblocks) each of which includes a set of blocks BLK, and may execute the erase operation in units of superblocks.

The superblocks are not limited to these but may include a total of thirty-two blocks BLK selected from the NAND flash memory dies #1 to #32, respectively. Each of the NAND flash memory dies #1 to #32 may have a multiplane configuration. For example, if each of the NAND flash memory dies #1 to #32 has the multiplane configuration including two planes, one superblock may include a total of sixty-four blocks BLK selected from sixty-four planes corresponding to the NAND flash memory dies #1 to #32, respectively. FIG. 6 illustrates a case where one superblock SB is composed of a total of thirty-two blocks BLK (i.e., the blocks BLK surrounded by a thick frame in FIG. 5) selected from the NAND flash memory dies #1 to #32, respectively.

As shown in FIG. 4, the controller 4 comprises a host interface 11, a CPU 12, a NAND interface 13, a DRAM interface 14, and the like. The CPU 12, the NAND interface 13, and the DRAM interface 14 are interconnected via a bus 10.

The host interface 11 is a host interface circuit configured to execute communication with the host 2. The host interface 11 may be, for example, a PCIe controller (NVMe controller). The host interface 11 receives various requests (commands) from the host 2. The requests (commands) include a write request (write command), a read request (read command), and the other various requests (commands).

The CPU 12 is a processor configured to control the host interface 11, the NAND interface 13, and the DRAM interface 14. The CPU 12 loads a control program (firmware) from the NAND flash memory 5 or a ROM (not shown) to the DRAM 6 in response to power-on of the flash storage device 3 and executes various processing by executing the firmware. The firmware may be loaded to SRAM (not shown) in the controller 4. The CPU 12 can execute command processing for processing various commands from the host 2, and the like. Operations of the CPU 12 are controlled by the above-explained firmware executed by the CPU 12. A part or all the command processing may be executed by exclusive hardware in the controller 4.

The CPU 12 can function as a write operation control unit 21, a read operation control unit 22, and a GC operation control unit 23. An application program interface (API) for implementing the system configuration shown at the right part of FIG. 2 is installed in the write operation control unit 21, the read operation control unit 22, and the GC operation control unit 23.

The write operation control unit 21 receives the write request (write command) designating the block number and the logical address from the host 2. The logical address is an identifier capable of identifying data (user data) to be written and may be, for example, LBA, a tag such as a key of a key-value store, or a hash value of the key of the key-value store. The block number is an identifier designating the block to which the data should be written. Various numbers that can uniquely identify an arbitrary one of the blocks can be used as the block number. The block designated by the block number may be a physical block or the above-explained superblock. When the write operation control unit 21 receives the write command, the write operation control unit 21 first determines a location (write destination location) in the block (write destination block) having the designated block number, to which the data should be written from the host 2. Next, the write operation control unit 21 writes the data (write data) from the host 2 to the write destination location of the write destination block. In this case, the write operation control unit 21 can write not only the data from the host 2, but also the data and the logical address of the data to the write destination block.

Then, the write operation control unit 21 updates the in-block LUT 32 which manages the mapping between the logical addresses and the in-block physical addresses of this block (write destination block), and maps the in-block physical address indicative of the above-explained write destination location of the write destination block to the logical address of the write data.

In this case, the in-block physical address is represented by an in-block offset indicative of the write destination location in the write destination block.

In this case, the in-block offset is indicative of an offset from the beginning (leading part) of the write destination block to the write destination location, i.e., an offset of the write destination location to the leading part of the write destination block. The size of the offset from the leading part of the write destination block to the write destination location is represented by a multiple of the grain having the size different from the page size. The grain is the above-explained access unit. The maximum value of the size of the grain is restricted to the block size. In other words, the in-block offset represents the offset from the leading part of the write destination block to the write destination location by a multiple of the grain having the size different from the page size.

The grain may have the size smaller than the page size. For example, if the page is 16K bytes, the size of the grain may be 4K bytes. In this case, a plurality of offset locations each having the size of 4K bytes are defined in a certain block. The in-block offset corresponding to the first offset location in the block is, for example, 0, the in-block offset corresponding to the next offset location in the block is, for example, 1, and the in-block offset corresponding to the further next offset location in the block is, for example, 2.

Alternatively, the grain may have the size larger than the page size. For example, the grain may have the size which is several times as large as the page size. If the page is 16K bytes, the grain may have the size of 32K bytes.

Thus, the write operation control unit 21 determines the write destination location in the block having the block number from the host 2 by itself and writes the write data from the host 2 to the write destination location in the block. Then, the write operation control unit 21 updates the in-block LUT 32 corresponding to this block, and maps the in-block physical address (in-block offset) indicative of the write destination location to the logical address of the write data. The flash storage device 3 can thereby hide the restrictions on page write order, the bad page, the page size, and the like, while urging the host 2 to handle the block numbers.

As a result, the host 2 can recognize the block boundary, but can manage the user data which exists at the block number without considering the restrictions on page write order, the bad page, and the page size.

If the read operation control unit 22 receives the read request (read command) designating the logical address and the block number from the host 2, the read operation control unit 22 refers to in-block LUT 32 corresponding to the block having the block number designated by this read request, by using this logical address. The read operation control unit 22 can thereby acquire the in-block physical address (in-block offset) of the block in which the data corresponding to the logical address is stored. Then, the read operation control unit 22 reads the data corresponding to the logical address from the NAND flash memory 5, based on the block number designated by the read command and the acquired in-block physical address.

In this case, the block to be read is specified by the block number. The physical location of the read target in the block is specified by the in-block offset. To obtain the physical location of the read target, the read operation control unit 22 may first divide the in-block offset by the number of grains (4 in this case) indicative of the page size, and determine a quotient and a remainder obtained by the division as the page number of the read target and the in-page offset of the read target, respectively.

If the GC operation control unit 23 receives from the host 2 a GC control command designating When the GC operation control unit 23 executes the garbage collection of the NAND flash memory 5, the GC operation control unit 23 selects a block having the designated copy source block number and a block having the designated copy destination block number, of a plurality of blocks of the NAND flash memory 5, as the copy source block (GC source block) and the copy destination block (GC destination block). The GC operation control unit 23 determines a copy destination location in the GC destination block to which the valid data stored in the selected GC source block should be written, and copies the valid data to the copy destination location in the GC destination block.

Then, the GC operation control unit 23 updates the in-block LUT corresponding to the GC source block and the in-block LUT corresponding to the GC destination block, such that the in-block physical address (in-block offset) mapped to the logical address of the valid data is changed from the in-block physical address indicative of the copy source location in the GC source block in which the valid data is stored to the in-block physical address indicative of the copy destination location in the GC destination block.

Management of valid data/invalid data may be executed by using the block management table 33. The block management table 33 may exist in, for example, each of the blocks. In the block management table 33 corresponding to a certain block, plural bit map flags corresponding to plural data included in this block are stored. Each of bit map flags indicates validity/invalidity of the data corresponding to the bit map flag. The valid data means data which is linked to the logical address as the latest data and which may be read later by the host 2. The invalid data means data which no longer has a possibility of being read from the host 2. For example, data associated with a certain logical address is valid data, and data associated with no logical address is invalid data.

As explained above, the GC operation control unit 23 determines a location (copy destination location) in the copy destination block (GC destination block) to which the valid data stored in the copy source block (GC source block) should be written, and copies the valid data to the determined location (copy destination location) of the copy destination block (GC destination block). In this case, the GC operation control unit 23 may copy both of the valid data and the logical address of the valid data to the copy destination block (GC destination block).

In the present embodiments, as explained above, the write operation control unit 21 can write both of the data (write data) from the host 2 and the logical data from the host 2 to the write destination block. For this reason, since the GC operation control unit 23 can easily acquire the logical address of each of the data in the copy source block (GC source block) from the copy source block (GC source block), the GC operation control unit 23 can easily update the in-block LUT corresponding to the copy source block and the in-block LUT corresponding to the copy destination block.

The NAND interface 13 is a memory control circuit configured to control the NAND flash memory 5 under the control of the CPU 12. The DRAM interface 14 is a DRAM control circuit configured to control the DRAM 6 under the control of the CPU 12. A part of a storage region of the DRAM 6 is used to store the write buffer (WB) 31. In addition, the other part of the storage region in the DRAM 6 is utilized to store the in-block LUT 32 and the block management table 33. The write buffer (WE) 31, the in-block LUT 32, and the block management table 33 may be stored in SRAM (not shown) in the controller 4.

Figures 7, 8:
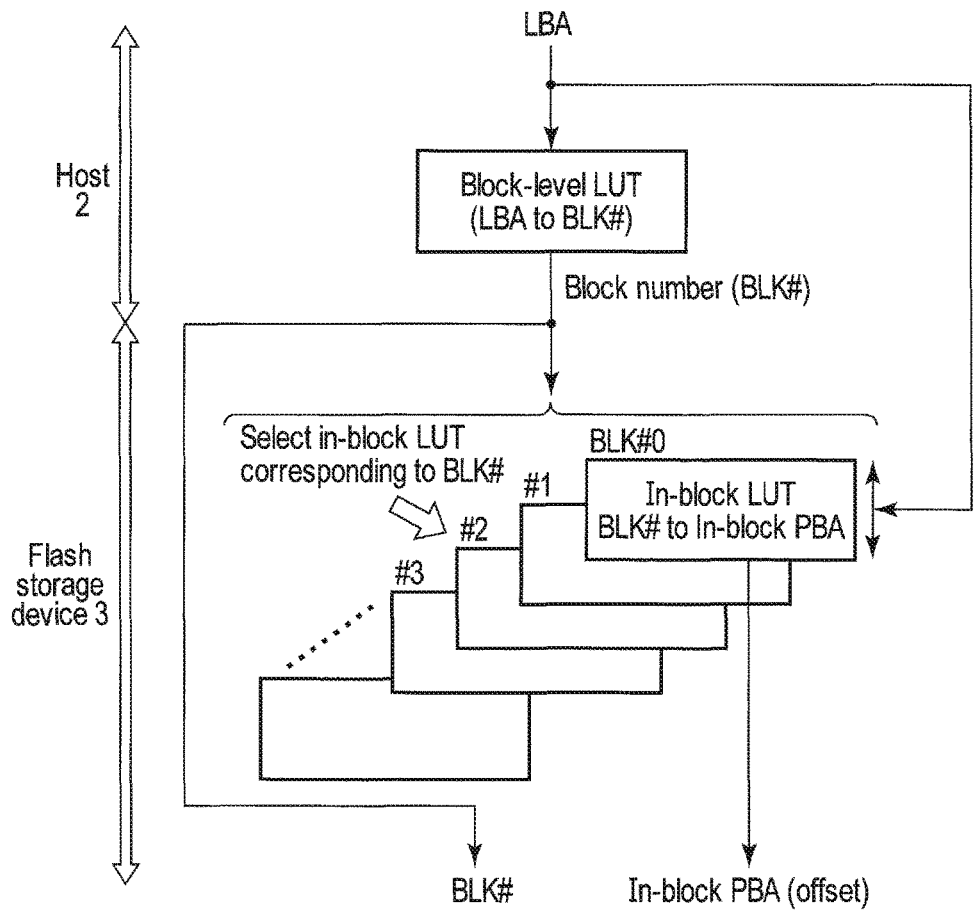
FIG. 7 is a diagram for explanation of a block-level address translation table managed by the host and an in-block address translation table managed by the flash storage device according to the embodiments.
FIG. 8 is a table for explanation of a write command applied to the flash storage device according to the embodiments.

FIG. 7 shows the block-level LUT (block-level address translation table) managed by the host 2 and the in-block LUT (in-block address translation table) managed by the flash storage device 3 according to the embodiments.

The block-level LUT manages mapping between the logical addresses and the block numbers corresponding to the blocks of the flash storage device 3. The block-level LUT is a table for translating a certain logical address to certain block number BLK#.

In the flash storage device 3, plural in-block LUTs corresponding to the plural blocks are managed. Each of the in-block. LUTs manages mapping between the logical addresses and the in-block physical addresses (in-block offsets) in the block corresponding to this in-block LUT. Each of the in-block LUTs is a table for translating a certain logical address into an in-block physical address (in-block PEA). The in-block physical address (in-block PEA) is represented by the in-block offset as explained above.

The address translation is executed in a manner explained below.

For example, in the read operation, the host 2 refers to the block-level LUT by using a certain logical address (for example, certain LBA) and translates the certain logical address (LBA) into block number ELK#. The logical address and the block number ELK# are transmitted from the host 2 to the flash storage device 3. In the present embodiments, a specific logical address range is not allocated to each block, but this logical address is transmitted from the host 2 to the flash storage device 3 together with block number BLK#, to enable the data corresponding to an arbitrary logical address to be stored in any block.

In the flash storage device 3, the controller 4 selects the in-block LUT corresponding to block number BLK#. For example, if block number BLK# from the host 2 is indicative of block number BLK#0, the in-block LUT corresponding to block number BLK#0 is selected. If block number. BLK# from the host 2 is indicative of block number BLK#1, the in-block LUT corresponding to block number BLK#1 is selected. If block number BLK# from the host 2 is indicative of block number BLK#2, the in-block LUT corresponding to block number BLK#2 is selected.

The selected in-block LUT is referred to by the logical address from the host 2. Then, the in-block PEA corresponding to the logical address is acquired from the selected in-block LUT.

FIG. 8 shows a write command applied to the flash storage device 3.

The write command is a command to request the flash storage device 3 to write the data. The write command may include the command ID, the block number BLK#, the logical address, the length, and the like.

The command ID is an ID (command code) indicating that this command is the write command, and the command ID for the write command is included in the write command.

The block number BLK# is an identifier (block address) capable of uniquely identifying the block to which the data (write data) should be written.

The logical address is an identifier for identifying the write data to be written. The logical address may be LBA, a key of a key-value store, or a hash value of the key of the key-value store, as explained above. If the logical address is LBA, the logical address (starting LBA) included in the write command is indicative of a logical location (first logical location) in which the write data should be written.

The length is indicative of the length of the write data which should be written. This length (data length) may be designated by the number of grains or the number of LBA, or the size may be designated by bytes.

When the controller 4 receives the write command from the host 2, the controller 4 determines the write destination location in the block having the block number designated by the write command. The write destination location is determined in consideration of the restrictions on page write order, the bad pages, and the like. The controller 4 writes the data (write data) from the host 2 to the write destination location in the block having the block number designated by the write command.

Figures 9, 10:
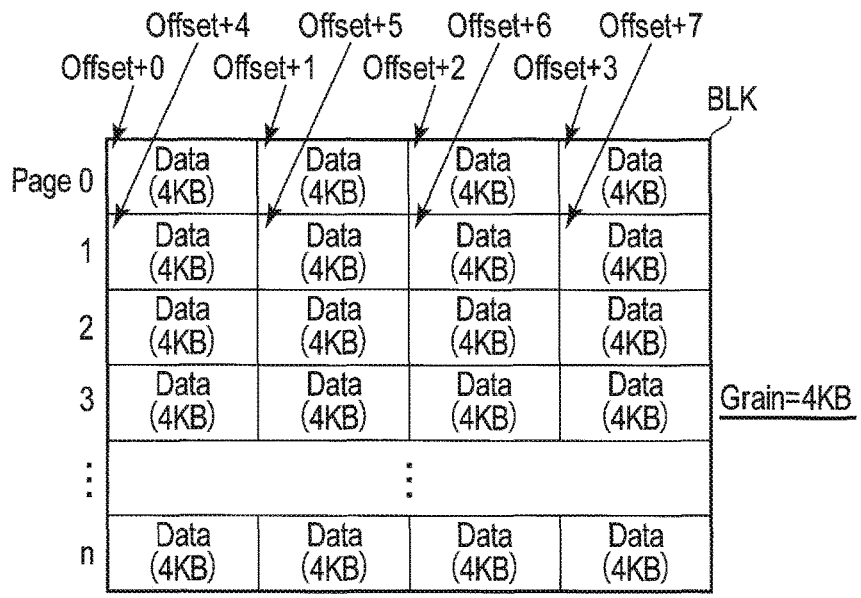
FIG. 9 is a table for explanation of a Trim command applied to the flash storage device according to the embodiments.
FIG. 10 is a block diagram for explanation of block numbers and offsets indicative of physical addresses.

FIG. 9 shows Trim command applied to the flash storage device 3.

The Trim command is a command including the block number of the block storing data which should be invalidated, and the logical address of the data. The Trim command includes the command ID, the block number BLK#, the logical address, the length, and the like.

The command ID is an ID (command code) indicating that this command is the Trim command, and the command ID for Trim command is included in the Trim command.

The block number is indicative of a block storing the data which should be invalidated.

The logical address is indicative of a first physical location of the data which should be invalidated.

The length is indicative of the length of the data which should be invalidated. This length (data length) may be designated by the number of logical addresses, the number of grains or bytes.

The controller 4 manages flags (bit map flags) indicating validity/invalidity of each of the data included in the respective blocks, by using the block management table 33. If the controller 4 receives from the host 2 the Trim command including the block number and the logical address indicative of the block storing the data which should be invalidated, the controller 4 updates the block management table 33, and changes the flag (bit map flag) corresponding to the in-block physical address specified by the block number and the logical address included in the Trim command to a value indicative of invalidity.

FIG. 10 shows the in-block offset which defines the in-block physical address.

The block number designates a certain block BLK. Each of the blocks BLK includes a plurality of pages (page 0 to page n in this case) as shown in FIG. 10.

In a case where the page size (user data storing area of each page) is 16K bytes and the grain is the size of 4 KB, this block BLK is logically divided into 4×(n+1) areas.

Offset +0 is indicative of a first 4 KB area of page 0, offset +1 is indicative of a second 4 KB area of page 0, offset +2 is indicative of a third 4 KB area of page 0, and offset +3 is indicative of a fourth 4 KB area of page 0.

Offset +4 is indicative of a first 4 KB area of page 1, offset +5 is indicative of a second 4 KB area of page 1, offset +6 is indicative of a third 4 KB area of page 1, and offset +7 is indicative of a fourth 4 KB area of page 1.

FIG. 11 shows a write operation executed in response to a write command.

It is assumed that the block BLK#1 is allocated as the write destination block. The controller 4 writes the data to the block. BLK#1 in page units, in order of page 0, page 1, page 2, . . . page n.

In FIG. 11, it is assumed that the write command designating the block number (=BLK#1), the logical address (LBAx), and the length (=4) has been received from the host 2 in a state in which 16K-byte data have already been written to page 0 of block BLK#1. The controller 4 determines page 1 of block BLK#1 as the write destination location, and writes the 16K-byte write data received from the host 2 to page 1 of block BLK#1. Then, the controller 4 updates the in-block LUT 32 corresponding to block BLK#1, and maps offset +5, offset +6, offset +7, and offset +8 to LBAx, LBAx+1, LBAx+2, and LBAx+3, respectively.

FIG. 22 shows a write operation for skipping the defective page (bad page).

In FIG. 12, it is assumed that the write command designating the block number (=BLK#1), the logical address (LBAx+1), and the length (=4) has been received from the host 2 in a state in which the data have already been written to page 0 and page 1 of block BLK#1. If page 2 of block BLK#1 is the defective page, the controller 4 determines page 3 of block BLK#1 as the write destination location and writes the 16K-byte write data received from the host 2 to page 3 of block BLK#1. Then, the controller 4 updates the in-block LUT 32 corresponding to block BLK#1, and maps offset +12, offset +13, offset +14, and offset +15 to LBAx+1, LBAx+2, LBAx+3, and LBAx+4, respectively.

Figure 13:
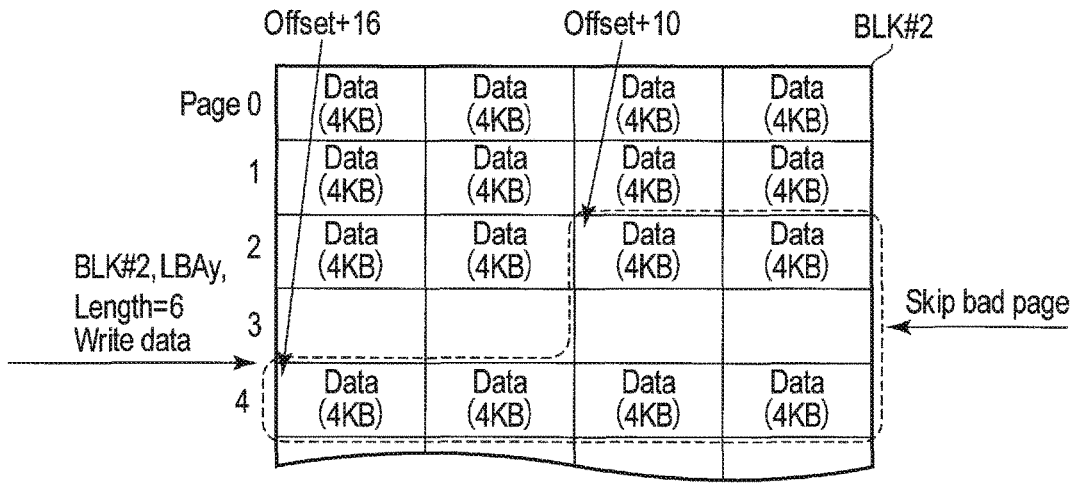
FIG. 13 is a block diagram for explanation of another example of the write operation which skips a defective page.

FIG. 13 shows another example of the write operation for skipping the defective page.

In FIG. 13, it is assumed that the data is written across two pages sandwiching the defective page. It is assumed that data have been written to page 0 and page 1 of block BLK#2 and that unwritten 8K-byte write data remain in the write buffer 31. If the write command designating the block number (=BLK#2), the logical address (LBAy) and the length (=6) is received in this state, the controller 4 prepares 16K-byte write data corresponding to the page size by using the unwritten 8K-byte write data and first 8K-byte write data in 24K-byte write data newly received from the host 2. Then, the controller 4 writes the prepared 16K-byte write data to page 2 of block BLK#2.

If next page 3 of block BLK#2 is the defective page, the controller 4 determines page 4 of block BLK#2 as the next write destination location and writes remaining 16K-byte write data in the 24K-byte write data received from the host 2 to page 4 of block BLK#2.

Then, the controller 4 updates the in-block LUT 32 corresponding to block BLK#2, maps offset +10 and offset +11 to LBAy and LBAy+1, respectively, and maps offset +16, offset +17, offset +18, and offset +19 to LBAy+2, LBAy+3, LBAy+4, and LBAy+5, respectively.

Figure 14:
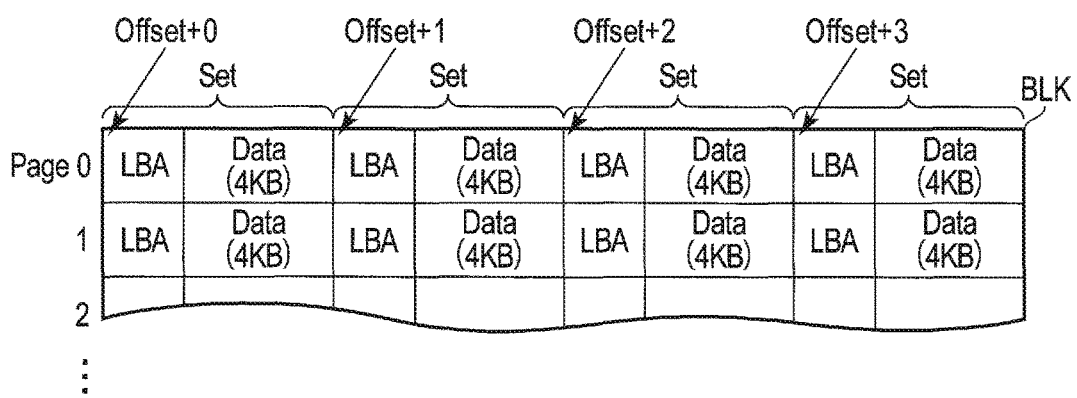
FIG. 14 is a block diagram for explanation of an operation of writing a pair of a logic address and data to a page in a block.
Figure 15:
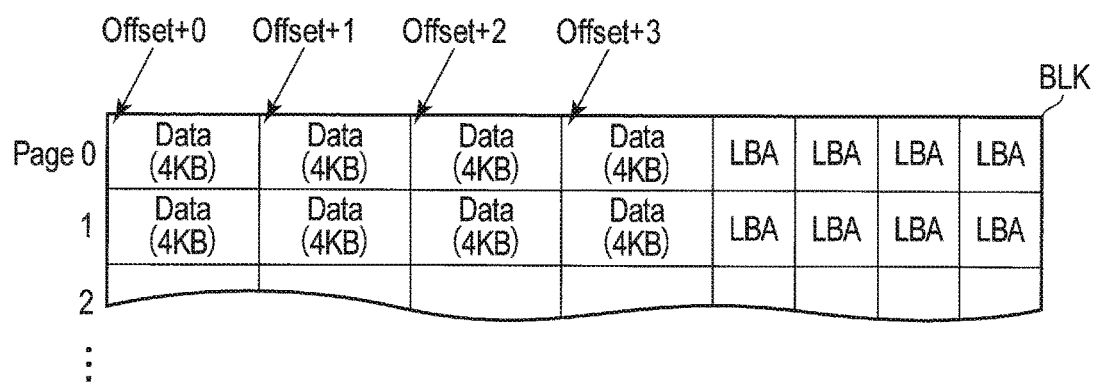
FIG. 15 is a block diagram for explanation of an operation of writing data in a user data area of the page and writing the logic address of the data to a redundant area of the page.

FIG. 14 and FIG. 15 show an operation of writing a pair of the logical address and the data to a page in the block.

In each of the blocks, each page may include a user data area for storing the user data and a redundant area for storing the management data. The page size is over 16 KB.

The controller 4 writes both of 4 KB user data and the logical address (for example, LBA) corresponding to the 4 KB user data to the write destination block BLK. In this case, as shown in FIG. 14, four data sets each including LBA and the 4 KB user data may be written to the same page. The in-block offset may be indicative of the set boundary.

Alternatively, as shown in FIG. 15, four 4 KB user data may be written to user data areas in the page and four LBAs corresponding to these 4 KB user data may be written to redundant areas in this page.

FIG. 16 shows a relationship between the block number and the offset (in-block offset) in a case of using a super block. The in-block offset is also referred to as offset, simply, in the following explanations.

To simplify the drawing, one superblock SB#1 is assumed to be composed of four blocks BLK#11, BLK#21, BLK#31, and BLK#41. The controller 4 writes the data in order of page 0 of block BLK#11, page 0 of block BLK#21, page 0 of block BLK#31, page 0 of block BLK#41, page 1 of block BLK#11, page 1 of block BLK#21, page 1 of block BLK#31, page 1 of block. BLK#41, Offset +0 is indicative of a first 4 KB area of page 0 of block BLK#11, offset +1 is indicative of a second 4 KB area of page 0 of block BLK#11, offset +2 is indicative of a third 4 KB area of page 0 of block BLK#11, and offset +3 is indicative of a fourth 4 KB area of page 0 of block BLK#11.

Offset +4 is indicative of a first 4 KB area of page 0 of block BLK#21, offset +5 is indicative of a second 4 KB area of page 0 of block BLK#21, offset +6 is indicative of a third 4 KB area of page 0 of block BLK#21, and offset +7 is indicative of a fourth 4 KB area of page 0 of block BLK#21.

Similarly, offset +12 is indicative of a first 4 KB area of page 0 of block BLK#41, offset +13 is indicative of a second 4 KB area of page 0 of block BLK#41, offset +14 is indicative of a third 4 KB area of page 0 of block BLK#41, and offset +15 is indicative of a fourth 4 KB area of page 0 of block BLK#41.

Offset +16 is indicative of a first 4 KB area of page 1 of block BLK#11, offset +17 is indicative of a second 4 KB area of page 1 of block BLK#11, offset +18 is indicative of a third 4 KB area of page 1 of block BLK#11, and offset +19 is indicative of a fourth 4 KB area of page 1 of block. BLK#11.

Offset +20 is indicative of a first 4 KB area of page 1 of block BLK#21, offset +21 is indicative of a second 4 KB area of page 1 of block BLK#21, offset +22 is indicative of a third 4 KB area of page 1 of block BLK#21, and offset +23 is indicative of a fourth 4 KB area of page 1 of block BLK#21.

Similarly, offset +28 is indicative of a first 4 KB area of page 1 of block BLK#41, offset +29 is indicative of a second 4 KB area of page 1 of block BLK#41, offset +30 is indicative of a third 4 KB area of page 1 of block BLK#41, and offset +31 is indicative of a fourth 4 KB area of page 1 of block BLK#41.

FIG. 17 shows a maximum block number get command applied to the flash storage device 3.

The maximum block number get command is a command for acquiring the maximum block number from the flash storage device 3. The host 2 can recognize the maximum block number indicative of the number of blocks included in the flash storage device 3 by transmitting the maximum block number get command to the flash storage device 3. The maximum block number get command includes a command ID for the maximum block number get command, and does not include a parameter.

FIG. 18 shows a response to the maximum block number get command.

When the flash storage device 3 receives the maximum block number get command from the host 2, the flash storage device 3 returns a response shown in FIG. 18 to the host 2. This response includes a parameter indicative of the maximum block number (i.e., the total number of available blocks included in the flash storage device 3).

FIG. 19 shows a block size get command applied to the flash storage device 3.

The block size get command is a command for acquiring the block size from the flash storage device 3. The host 2 can recognize the block size of the NAND flash memory 5 included in the flash storage device 3 by transmitting the block size get command to the flash storage device 3.

In the other embodiments, the block size get command may include a parameter designating the block number. When the flash storage device 3 receives the block size get command designating a certain block number from the host 2, the flash storage device 3 returns the block size of the block having this block number to the host 2. Thus, even if the block size of each of the blocks included in the NAND flash memory 5 is nonuniform, the host 2 can recognize the block size of each of the blocks.

FIG. 20 shows a response to the block size get command.

When the flash storage device 3 receives the block size get command from the host 2, the flash storage device 3 returns the block size (i.e., the block size common to the blocks included in the NAND flash memory 5) to the host 2. In this case, if the block number is designated by the block size get command, the flash storage device 3 returns the block size of the block having this block number to the host 2 as explained above.

FIG. 21 shows a block allocate get command applied to the flash storage device 3.

The block allocate command is a command to request the flash storage device 3 to allocate the block (free block). The host 2 can require the flash storage device 3 to allocate the free block and can thereby acquire the block number (i.e., the block number of the allocated free block), by transmitting the block allocate command to the flash storage device 3.

In a case where the flash storage device 3 manages the free blocks by the free block list and the host 2 does not manage the free blocks, the host 2 requires the flash storage device 3 to allocate the free block and thereby acquires the block number. In contrast, in a case where the host 2 manages the free blocks, the host 2 does not need to transmit the block allocate command to the flash storage device 3 since the host 2 can select one of the free blocks by itself.

FIG. 22 shows a response to the block allocate command.

When the flash storage device 3 receives the block allocate command from the host 2, the flash storage device 3 selects the free block which should be allocated to the host 2, of the free block list, and returns the response including the block number of the selected free block to the host 2.

FIG. 23 shows block information acquisition executed by the host 2 and the flash storage device 3.

When the host 2 starts use of the flash storage device 3, the host 2 first transmits the maximum block number get command to the flash storage device 3. The controller of the flash storage device 3 returns the maximum block number to the host 2. The maximum block number is indicative of the total number of available blocks. In a case of using the above-explained superblocks, the maximum block number may be indicative of the total number of available superblocks.

Next, the host. 2 transmits the block size get command to the flash storage device 3 and acquires the block size. In this case, the host 2 may transmit the block size get command designating block number 1, the block size get command designating block number 2, the block size get command designating block number 3, . . . to the flash storage device 3 and individually acquire the block size of each of all of the blocks.

The host 2 can recognize the number of available blocks and the block size of each block by the block information acquisition.

FIG. 24 shows a sequence of write operation processing executed by the host 2 and the flash storage device 3.

The host 2 first selects the block (free block) which should be used for writing by itself, or requests the flash storage device 3 to allocate the free block by transmitting the block allocate command to the flash storage device 3. Then, the host 2 transmits to the flash storage device 3 the write command including block number BLK# of the block selected by itself (or block number BLK# of the free block allocated by the flash storage device 3), the logical address (LBA), and the length (step S20).

When the controller 4 of the flash storage device 3 receives the write command, the controller 4 determines the write destination location in the block (write destination block BLK#) having the block number BLK#, to which the data should be written from the host 2, and writes the write data to the write destination location of the write destination block BLK# (step S11). In step S11, the controller 4 may write both of the logical address (LBA in this case) and the write data to the write destination block.

The controller 4 updates the in-block LUT corresponding to write destination block BLK#, and maps the offset (in-block offset) indicative of the write destination location to the logical address (step S12).

Next, the controller 4 updates the block management table 33 corresponding to the write destination block BLK#, and changes a bit map flag corresponding to the written data (i.e., a bit map flag corresponding to the offset (in-block offset) to which the data has been written) from 0 to 1 (step S13).

Figures 25, 26:
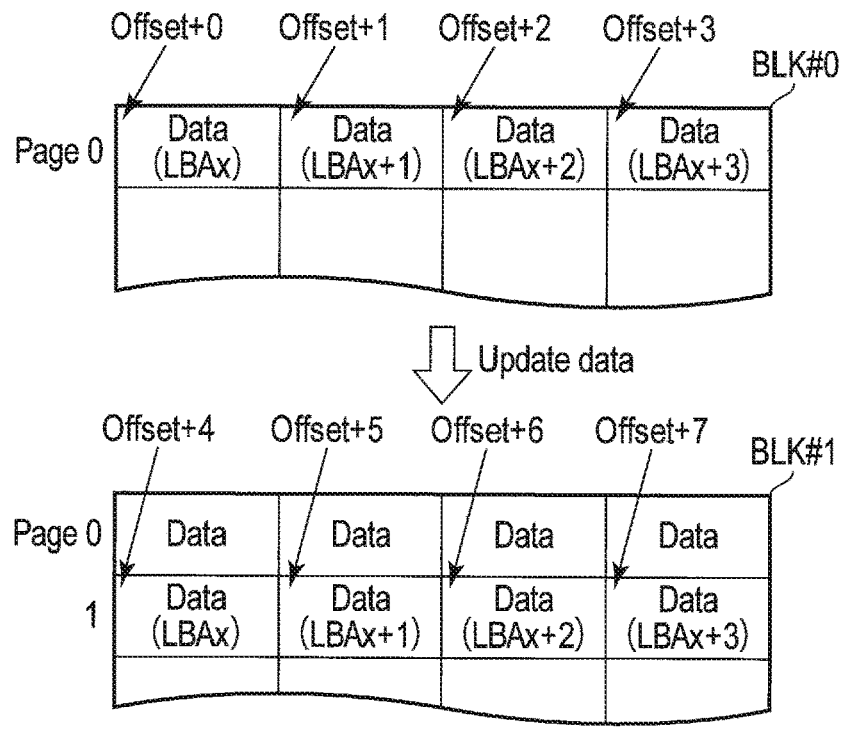
FIG. 25 is a block diagram showing a data update operation of writing update data for already written data.
FIG. 26 is a diagram for explanation of in-block LUT for block number BLK#1 managed by the flash storage device according to the embodiments.
Figure 34:
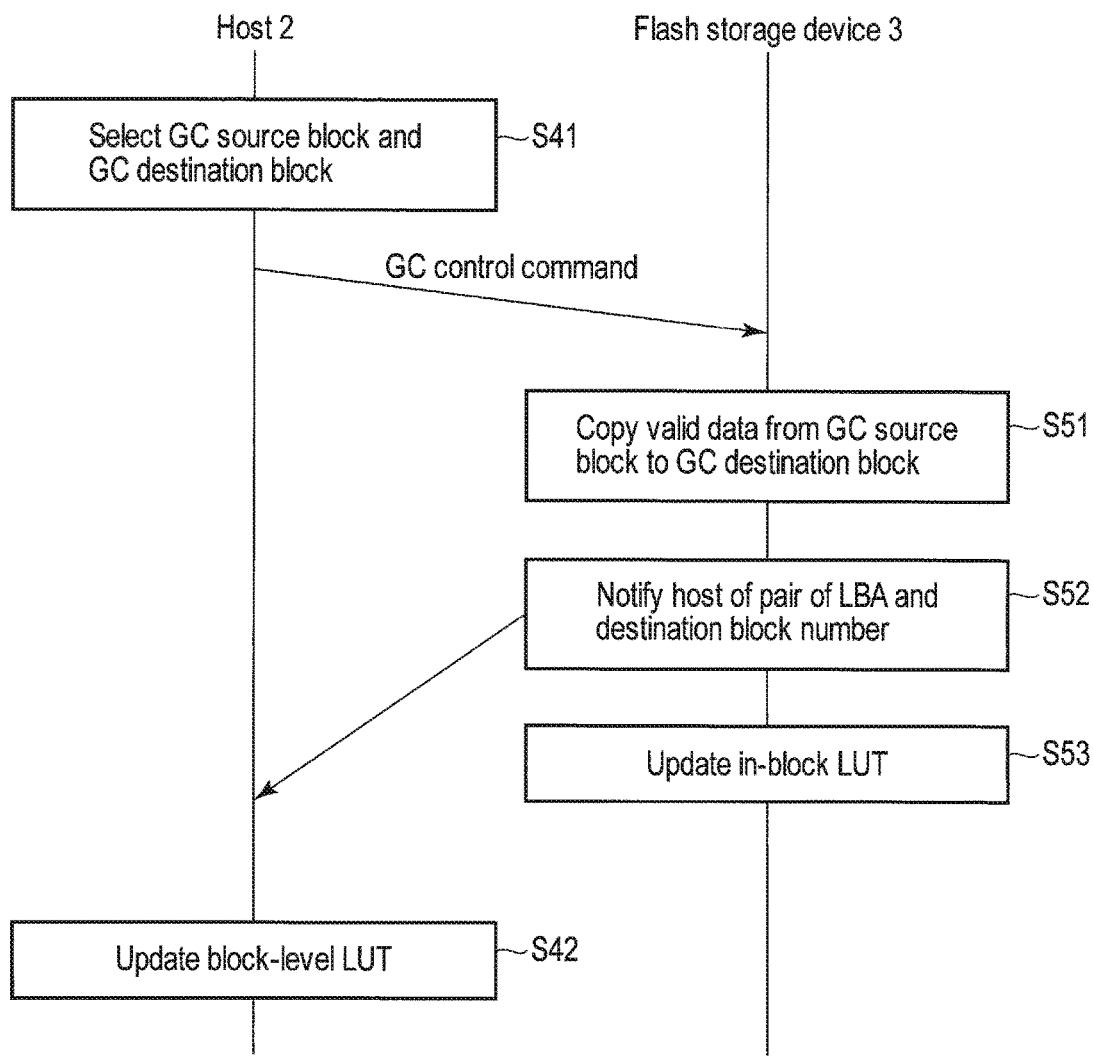
FIG. 34 is a sequence chart showing a procedure of the garbage collection (GC) operation executed by the host and the flash storage device according to the embodiments.

It is assumed that as shown in FIG. 25, for example, 16K-byte update data in which start LBA is LBAx are written to the physical locations corresponding to offsets +4 to +7 of block BLK#1. In this case, as shown in FIG. 26, offsets +4 to +7 are mapped to LBAx to LBAx+3 in the in-block LUT for block BLK#1. In addition, as shown in FIG. 27, each of the bit map flags corresponding to offsets +4 to +7 is changed from 0 to 1 in the block management table for block BLK#1.

The controller 4 returns a response (success/failure) to the write command to the host 2 (step S14).

When the host 2 receives this response, the host 2 updates block-level LUT managed by the host 2 and maps the block number BLK# of the write destination block BLK# to the logical address corresponding to the written write data (step S21). As shown in FIG. 28, block-level LUT includes a plurality of entries corresponding to the respective logical addresses (for example, LBAs). In an entry corresponding to a certain logical address (for example, certain LBA), the block number of the NAND flash memory 5 in which the data corresponding to the LBA is stored. As shown in FIG. 25, if 16K-byte update data in which the start IBA is LBAx is written to block BLK#1, in-block LUT is updated and the block number corresponding to LBAx to LBAx+3 is changed from BLK#0 to BLK#1 as shown in FIG. 28.

After that, as shown in FIG. 24, the host 2 transmits the Trim command to invalidate previous data which become unnecessary due to write of the above update data, to the flash storage device 3. The controller 4 of the flash storage device 3 updates the in-block LUT and the block management table in response to the Trim command (steps S15 and S16).

If the previous data are stored in block BLK#0 as shown in FIG. 25, the Trim command designating the block number (=BLK#0), LBAx, and the length (=4) is transmitted from the host 2 to the flash storage device 3 as shown in FIG. 29. The controller 4 of the flash storage device 3 updates the in-block LUT corresponding to BLK#0 and deletes information indicative of mapping between LBAx to LBAx+3 and offsets +1 to +3, in response to the Trim command. In this case, the controller 4 may change LBAx to LBAx+3 and offsets +1 to +3 to a value (null) indicative of invalidity. Furthermore, the controller 4 updates the block management table 33 corresponding to BLK30 and changes each of the bit map flags corresponding to offsets +0 to from 1 to 0.

FIG. 30 shows a read command applied to the flash storage device 3.

The read command is a command to request the flash storage device 3 to read the data. The read command includes the command ID, the block number BLK#, the logical address, the length, and a transfer destination pointer.

The command ID is an ID (command code) indicating that this command is the read command, and the command ID for the read command is included in the read command.

The block number BLK# is indicative of a block number of a block storing the data which should be read. The logical address is the logical address of the data which should be read.

The length is indicative of the length of the data which should be read. The data length may be indicated by the number of LBAs or the number of grains.

The transfer destination pointer is indicative of the location on the memory in the host 2 to which the read data is to be transferred.

FIG. 31 shows a sequence of read processing executed by the host 2 and the flash storage device 3. The host 2 translates the logical address (LBA) included in the read request from the user application into the block number by referring to in-block LUT managed by the host 2. Then, the host 2 transmits the read command designating the block number, LBA, and the length to the flash storage device 3.

When the controller 4 of the flash storage device 3 receives the read command from the host 2, the controller 4 selects in-block LUT corresponding to the block number designated by the read command, refers to the selected in-block LUT with LBA in the read command, and acquires the offset (in-block offset) corresponding to this LBA (step S31). The controller 4 reads the data corresponding to the LBA from the NAND flash memory 5, based on the block number designated by the read command and the acquired offset (in-block offset) (step S32), and transmits the read data to the host 2.

FIG. 32 shows a GC control command applied to the flash storage device 3.

The GC control command is used to notify the flash storage device 3 of the GC source block number and the GC destination block number. The host 2 manages the valid data amount/invalid data amount of each block, and can select several blocks in which the valid data amount is smaller as the GC source blocks. In addition, the host 2 manages the free block list, and can select several free blocks as the GC destination blocks. The GC control command may include the command. ID, the GC source block number, the GC destination block number, and the like.

The command ID is the ID (command code) indicating that this command is the GC control command, and the command ID for the GC control command is included in the GC control command.

The GC source block number is a block number indicative of the GC source block. The host 2 can designate the block which should be the GC source block. The host 2 may set a plurality of GC source block numbers to one GC control command.

The GC destination block number is a block number indicative of the GC destination block. The host 2 can designate the block which should be the GC destination block. The host 2 may set a plurality of GC destination block numbers to one GC control command.

FIG. 33 shows a callback command for GC.

The callback command for GC is used to notify the host 2 of a list including pairs of the logical addresses (LBAs) and the destination block numbers. The logical address (LBA) included in a certain pair is the logical address of the copied valid data. The destination block number included in this pair is the block number of the GC destination block in which the valid data has been copied. This callback command for GC may be transmitted from the flash storage device 3 to the host 2 only when the GC source block numbers and the GC destination block numbers are designated by the GC control command.

FIG. 28 shows a procedure of the garbage collection (GC) operation.

For example, if the number of remaining free blocks included in the free block list managed by the host 2 is reduced to a threshold value or less, the host 2 selects the GC source block and the GC destination block and transmits the GC control command to the flash storage device 3 (step S41).

When receiving this GC control command, the controller 4 of the flash storage device 3 executes a data copy operation including an operation of determining a location (copy destination location) in the GC destination block to which the valid data in the GC source block should be written, and an operation of copying the valid data in the GC source block to the copy destination location in the GC destination block (step S51). In step S51, the data copy operation is repeated until copying all of the valid data in GC source block is completed. If a plurality of GC source blocks are designated by the GC control command, the data copy operation is repeated until copying all of the valid data in all of the GC source blocks is completed.

Then, the controller 4 notifies the host 2 of the pairs of the logical addresses (LBAs) and the destination block numbers by using the callback command for GC (step S52), and updates the in-block LUT corresponding to the GC source block and the in-block LUT corresponding to the GC destination block, such that the offset (in-block offset) mapped to the logical address of the copied valid data is changed from the offset (in-block offset) indicative of the copy source location in the GC source block to the offset (in-block offset) indicative of the copy destination location in the GC destination block (step S53).

The host 2 updates the in-block LUT, based on the list of which the flash storage device 3 notifies the host 2 (step S42).

FIG. 35 shows an operation of copying all valid data in a plurality of GC source blocks to a plurality of GC destination blocks.

It is assumed that block BLK#1, block BLK#2, and block BLK#3 are designated as the GC source blocks by the host 2 and that block BLK#50 and block BLK#51 are designated as the GC destination blocks by the host 2. The valid data and the invalid data exist together in each of block BLK#1, block BLK#2, and block BLK#3.

First, all of the valid data in block BLK#1 are copied to block BLK#50. Next, several data of all of the valid data in block BLK#2 are copied to remaining free area of block BLK#50, and the remaining valid data of block BLK#2 are copied to block BLK#51. Then, all of the valid data in block BLK#3 are copied to block BLK#51.

The controller 4 may copy not only the valid data in each of the GC source blocks, but also both of the valid data and the logical address corresponding to the valid data from the GC source block (copy source block) to the GC destination block (copy destination block). A pair of the data and the logical address can be thereby held in the GC destination block (copy destination block).

Figure 36:
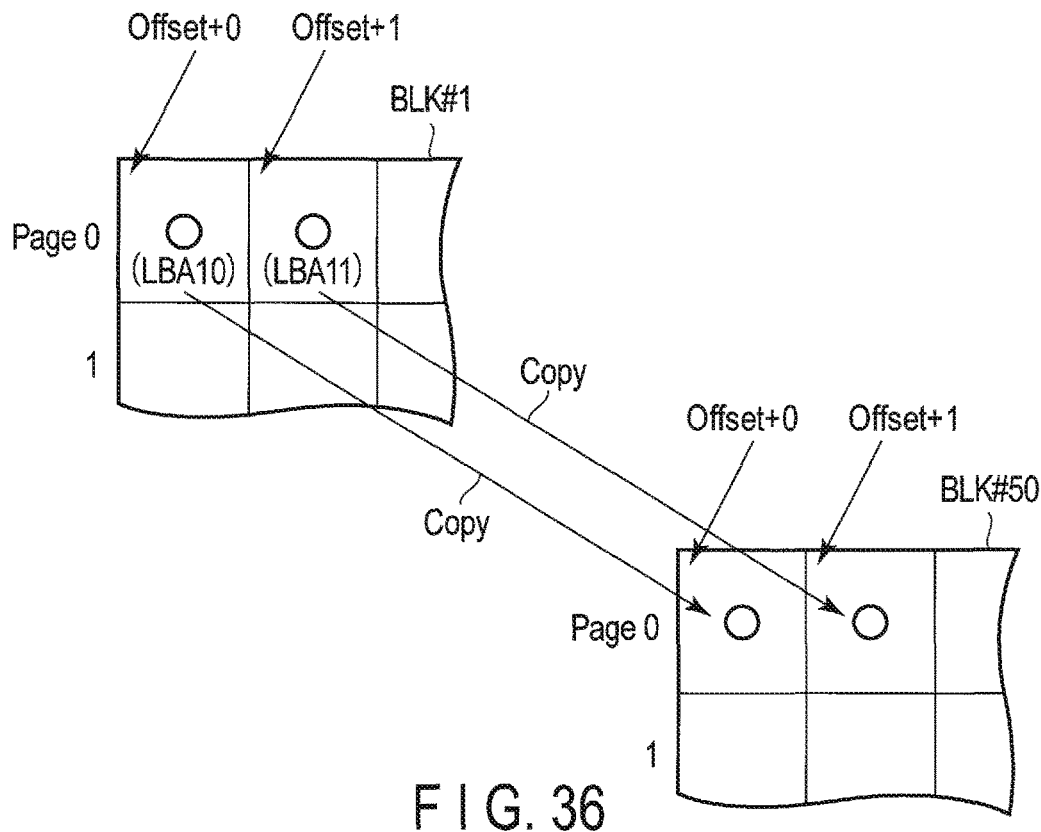
FIG. 36 is a diagram for explanation of an example of a data copy operation executed for the garbage collection (GC).

FIG. 36 shows an example of a data copy operation executed for GC.

In FIG. 36, it is assumed that the valid data (LBA=10) stored in the location corresponding to offset +0 of the GC source block (block BLK#1 in this case) is copied to the location corresponding to offset +0 of the GC destination block (block BLK#50 in this case) and that the valid data (LBA=11) stored in the location corresponding to offset +1 of the GC source block (block BLK#1 in this case) is copied to the location corresponding to offset +1 of the GC destination block (block BLK#50 in this case).

Figure 37:
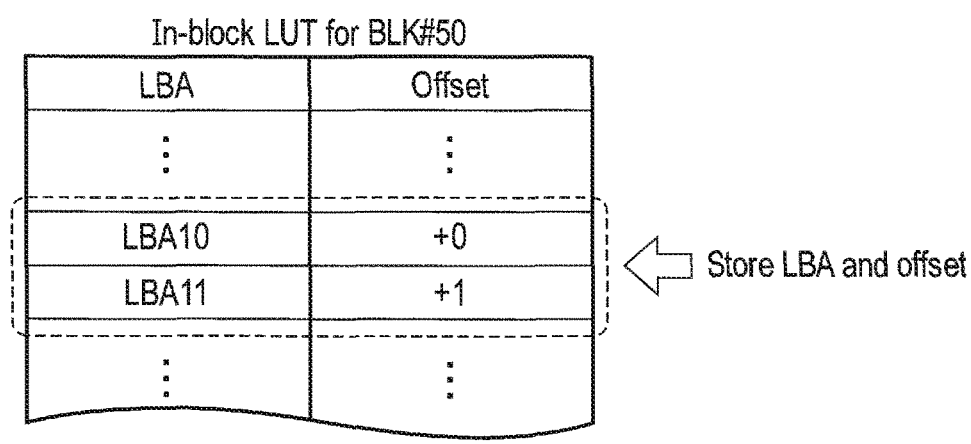
FIG. 37 is an illustration for explanation of contents of an in-block LUT of the GC destination block updated based on a result of the data copy operation shown in FIG. 36.

In this case, the controller 4 updates the in-block LUT corresponding to block BLK#50, and stores a pair of LBA 10 and offset +0 and a pair of LBA 11 and offset +1, in the in-block LUT corresponding to block BLK#50, as shown in FIG. 37. Thus, offset +0 is mapped to LBA 10, and offset +1 is mapped to LBA 10. In addition, the controller 4 updates the in-block LUT corresponding to block BLK#10, and deletes a pair of LBA 10 and offset +0 and a pair of LBA 11 and offset +1, in the in-block LUT corresponding to block BLK#1, as shown in FIG. 38. Furthermore, the controller 4 notifies the host 2 of a pair of LBA 10 and the destination block number (BLK#50) and a pair of LBA 11 and the destination block number (BLK#50).

The host 2 updates the block-level LUT, changes the block number mapped to LBA 10 from BLK#1 to BLK#50, and also changes the block number mapped to LBA 11 from BLK#1 to BLK#50, based on this notification, as shown in FIG. 39.

As explained above, according to the present embodiments, if the controller 4 of the flash storage device 3 receives the write request designating the first block number and the first logical address from the host 2, the controller 4 determines the location (write destination location) in the block (write destination block) having the first block number, to which the data should be written from the host 2, writes the data from the host 2 to the write destination location of the write destination block, updates the in-block LUT managing the mapping between each of the logical addresses and each of the in-block physical addresses (in-block offsets) of the write destination block, and maps the in-block offset indicative of the write destination location to the first logical address. In addition, if the controller 4 receives the read request designating the above-explained first block number and the above-explained first logical address from the host 2, the controller 4 acquires the in-block physical address (in-block offset) to which the data corresponding to the first logical address is written, by referring to the in-block LUT by using the first logical address, and reads the data corresponding to the first logical address from the flash storage device 5, based on the first block number and the acquired in-block physical address (in-block offset).

Therefore, the configuration in which the host 2 handles the block number and the flash storage device 3 determines the write destination location in the block having the block number designated by the host 2 by considering the restrictions on page write order/bad page, and the like can be implemented. By handling the block number by the host 2, merge of the application-level address translation table of the upper layer (host 2) with the LUT-level address translation table of the conventional SSD can be implemented. In addition, the flash storage device 3 can control the NAND flash memory 5 in consideration of the characteristics/restrictions of the NAND flash memory 5. Furthermore, since the host 2 can recognize the block boundary, the host 2 can write the user data to each block in consideration of the block boundary/block size. Since the host 2 can thereby execute the control such as simultaneously invalidating the data in the same block by data update or the like, the frequency at which GC is executed can be reduced. As a result, the write amplification can be lowered, the performance of the flash storage device 3 can be improved, and the life of the flash storage device 3 can be extended to the maximum value.

Therefore, appropriate role sharing between the host 2 and the flash storage device 3 can be implemented, and improvement of the I/O performance of the whole system including the host 2 and the flash storage device 3 can be thereby attempted.

In addition, according to the present embodiments, the controller 4 determines a copy destination location in the GC destination block to which the valid data should be written, and copies the valid data to the copy destination location in the copy destination block. Therefore, the host 2 needs only to execute the only action of selecting the copy source block and the copy destination block. In addition, since the application level GC can be merged with GC of the flash storage device 3, the write amplification can be remarkably reduced.

The flash storage device 3 may be utilized as one of a plurality of flash storage devices 3 provided in the storage array. The storage array may be connected to the information processing device such as a server computer via a cable or a network. The storage array comprises a controller which controls the flash storage devices 3 in the storage array. If the flash storage devices 3 are applied to the storage array, the controller of the storage array may function as the host 2 of the flash storage devices 3.

In addition, in the present embodiments, the NAND flash memory has been explained as an example of a nonvolatile memory. However, the functions of the present embodiments are also applicable to various other nonvolatile memories such as a magnetoresistive random access memory (MRAM), a phase change random access memory (PRAM), a resistive random access memory (ReRAM) and a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, comprising:
    a nonvolatile memory including a plurality of blocks each including a plurality of pages; and
    a controller electrically connected to the nonvolatile memory to control the nonvolatile memory,
    wherein the controller is configured, when receiving a write request to designate a first block number and a first logical address from the host, to determine a first location in a first block having the first block number, to which data from the host is to be written, to write the data from the host to the first location of the first block, to update a first address translation table managing mapping between logical addresses and in-block physical addresses of the first block but not mapping between the logical addresses and a physical address of the first block, and to map a first in-block physical address indicative of the first location to the first logical address, and when receiving a read request to designate the first block number and the first logical address from the host, to acquire the first in-block physical address by referring to the first address translation table using the first logical address, and to read data corresponding to the first logical address from the nonvolatile memory, based on the first block number and the acquired first in-block physical address.

2. The memory system of claim 1, wherein the first in-block physical address is represented by a first in-block offset indicating an offset from a leading part of the first block to the first location by a multiple of a grain having a size different from a page size.

3. The memory system of claim 1, wherein the controller is configured, when receiving from the host a control command designating a copy source block number and a copy destination block number for garbage collection of the nonvolatile memory, to select a second block having the copy source block number and a third block having the copy destination block number, of the plurality of blocks, to determine a copy destination location in the third block to which valid data stored in the second block is to be written, and to copy the valid data to the copy destination location of the third block.

4. The memory system of claim 3, wherein the controller is configured to update a second address translation table managing mapping between logical addresses and in-block physical addresses of the second block, and a third address translation table managing mapping between logical addresses and in-block physical addresses of the third block, such that an in-block physical address mapped to a logical address of the valid data is changed from a second in-block physical address indicative of a copy source location in the second block in which the valid data is stored to a third in-block physical address indicative of the copy destination location of the third block.

5. The memory system of claim 4, wherein the second in-block physical address is represented by a second in-block offset indicating an offset from a leading part of the second block to the copy source location by a multiple of a grain having a size different from a page size, and the third in-block physical address is represented by a third in-block offset indicating an offset from a leading part of the third block to the copy destination location by a multiple of the grain.

6. The memory system of claim 3, wherein the controller is configured to notify the host of a logical address of the valid data and the copy destination block number to which the valid data is copied.

7. The memory system of claim 1, wherein the controller is configured, when receiving a first command to request a maximum block number from the host, to notify the host of the maximum block number indicative of number of the plurality of blocks, and when receiving a second command to request a block size from the host, to notify the host of the block size of each of the plurality of blocks.

8. The memory system of claim 7, wherein the controller is configured, if a block number is included in the second command, to notify the host of a block size of a block having the block number included in the second command.

9. The memory system of claim 7, wherein the controller is configured, when receiving from the host a control command designating a plurality of copy source block numbers and a plurality of copy destination block numbers for garbage collection of the nonvolatile memory, to select a plurality of second blocks having the plurality of copy source block numbers and a plurality of third blocks having the plurality of copy destination block numbers, of the plurality of blocks, to determine a copy destination location in one of the plurality of third blocks to which valid data stored in one of the second blocks is to be written, to copy the valid data to the copy destination location of the third block, and to notify the host of the logical address of the copied valid data and the block number of the third block.

10. A memory system connectable to a host, comprising:
a nonvolatile memory including a plurality of blocks each including a plurality of pages; and
a controller electrically connected to the nonvolatile memory to control the nonvolatile memory,
wherein the controller is configured, when receiving a first command requesting a maximum block number from the host, to notify the host of the maximum block number indicative of number of the plurality of blocks, when receiving a second command requesting a block size from the host, to notify the host of the block size of each of the plurality of blocks, when receiving a write request to designate a first block number and a first logical address from the host, to determine a first location in a first block having the first block number, to which data from the host is to be written, to write the data from the host to the first location of the first block, to update a first address translation table managing mapping between logical addresses and in-block physical addresses of the first block, and to map a first in-block physical address indicative of the first location to the first logical address, when receiving a read request to designate the first block number and the first logical address from the host, to acquire the first in-block physical address by referring to the first address translation table using the first logical address, and to read data corresponding to the first logical address from the nonvolatile memory, based on the first block number and the acquired first in-block physical address.

11. The memory system of claim 10, wherein the first in-block physical address is represented by a first in-block offset indicating an offset from a leading part of the first block to the first location by a multiple of a grain having a size different from a page size.

12. A method of controlling a nonvolatile memory including a plurality of blocks each including a plurality of pages, the method comprising:
when receiving a write request to designate a first block number and a first logical address from a host, executing an operation of determining a first location in a first block having the first block number, to which data from the host is to be written, an operation of writing the data from the host to the first location of the first block, an operation of updating a first address translation table managing mapping between logical addresses and in-block physical addresses of the first block but not mapping between the logical addresses and a physical address of the first block, and an operation of mapping a first in-block physical address indicative of the first location to the first logical address; and
when receiving a read request to designate the first block number and the first logical address from the host, executing an operation of acquiring the first in-block physical address by referring to the first address translation table using the first logical address, and an operation of reading data corresponding to the first logical address from the nonvolatile memory, based on the first block number and the acquired first in-block physical address.

* * * * *